(12) United States Patent
Taira et al.

(10) Patent No.: US 11,515,683 B2
(45) Date of Patent: Nov. 29, 2022

(54) METHOD FOR MANUFACTURING OPTICAL ELEMENT AND OPTICAL ELEMENT

(71) Applicant: INTER-UNIVERSITY RESEARCH INSTITUTE CORPORATION NATIONAL INSTITUTES OF NATURAL SCIENCES, Mitaka (JP)

(72) Inventors: Takunori Taira, Okazaki (JP); Arvydas Kausas, Okazaki (JP); Lihe Zheng, Okazaki (JP)

(73) Assignee: INTER-UNIVERSITY RESEARCH INSTITUTE CORPORATION NATIONAL INSTITUTES OF NATURAL SCIENCES, Mitaka (JP)

( * ) Notice: Subject to any disclaimer, the term of this patent is extended or adjusted under 35 U.S.C. 154(b) by 0 days.

(21) Appl. No.: 17/619,323

(22) PCT Filed: Jun. 12, 2020

(86) PCT No.: PCT/JP2020/023233
§ 371 (c)(1),
(2) Date: Dec. 15, 2021

(87) PCT Pub. No.: WO2020/255880
PCT Pub. Date: Dec. 24, 2020

(65) Prior Publication Data
US 2022/0271488 A1    Aug. 25, 2022

(30) Foreign Application Priority Data

Jun. 18, 2019    (JP) .............................. JP2019-113115

(51) Int. Cl.
*H01S 3/07*    (2006.01)
*H01S 3/06*    (2006.01)
*F21V 8/00*    (2006.01)
*H01S 3/16*    (2006.01)
(Continued)

(52) U.S. Cl.
CPC ................ *H01S 3/07* (2013.01); *H01S 3/042* (2013.01); *H01S 3/0405* (2013.01);
(Continued)

(58) Field of Classification Search
CPC .......... H01S 3/07; H01S 3/0405; H01S 3/042; H01S 3/0606; H01S 3/0621; H01S 3/0604; H01S 3/16; G02B 1/02; G02B 6/0065
See application file for complete search history.

(56) References Cited

U.S. PATENT DOCUMENTS 7,332,431 B2 *   2/2008  Maekawa ......... H01L 29/78675
                                                     257/E21.32
7,515,333 B1     4/2009  Empedocles
(Continued)

FOREIGN PATENT DOCUMENTS

CN    105474354 A    4/2016
CN    107492779 A    12/2017
(Continued)

OTHER PUBLICATIONS

International Preliminary Report on Patentability dated Dec. 30, 2021 for PCT/JP2020/023233.

*Primary Examiner* — M. A. Golub-Miller
(74) *Attorney, Agent, or Firm* — Faegre Drinker Biddle & Reath LLP

(57) ABSTRACT

A method for manufacturing an optical element is a method for manufacturing an optical element in which laser light is transmitted, reciprocated, or reflected, and the method includes a first step of obtaining a bonded element formed by subjecting a first element part and a second element part, both being transparent to laser light, to surface activated bonding with a non-crystalline layer interposed therebetween; and after the first step, a second step of crystallizing at least a portion of the non-crystalline layer by raising the (Continued)

temperature of the bonded element. In the second step, the temperature of the bonded element is raised to a predetermined temperature that is lower than the melting points of the first element part and the second element part.

12 Claims, 22 Drawing Sheets

(51) Int. Cl.
    *H01S 3/042*     (2006.01)
    *H01S 3/04*     (2006.01)
    *G02B 1/02*     (2006.01)

(52) U.S. Cl.
    CPC .......... *H01S 3/0606* (2013.01); *H01S 3/0621* (2013.01); *G02B 1/02* (2013.01); *G02B 6/0065* (2013.01); *H01S 3/0604* (2013.01); *H01S 3/16* (2013.01)

(56) References Cited

U.S. PATENT DOCUMENTS

| | | | |
|---|---|---|---|
| 2003/0063638 A1* | 4/2003 | Hasson | H01S 3/042 372/36 |
| 2004/0003627 A1* | 1/2004 | Hashima | C03C 4/12 65/33.2 |
| 2004/0037340 A1* | 2/2004 | Yanagisawa | H01S 3/0606 359/345 |
| 2006/0083276 A1* | 4/2006 | Brown | H01S 3/042 372/36 |
| 2006/0114951 A1* | 6/2006 | Chou | H01S 3/0627 372/36 |
| 2007/0183467 A1* | 8/2007 | Ketteridge | H01S 3/0604 372/68 |
| 2017/0358898 A1* | 12/2017 | Taira | H01S 3/2316 |
| 2018/0006423 A1* | 1/2018 | Sekine | H01S 3/042 |
| 2018/0123309 A1 | 5/2018 | Taira et al. | |
| 2019/0229486 A1* | 7/2019 | Taira | H01S 3/0401 |

FOREIGN PATENT DOCUMENTS

| | | | |
|---|---|---|---|
| JP | 2003-270602 A | 9/2003 |
| JP | 2015-210492 A | 11/2015 |
| JP | 2015-220320 A | 12/2015 |
| JP | 2017-220652 A | 12/2017 |
| JP | 6245587 B1 | 12/2017 |
| JP | 2019-073402 A | 5/2019 |
| WO | WO-2015/174252 A1 | 11/2015 |

* cited by examiner

Fig.2
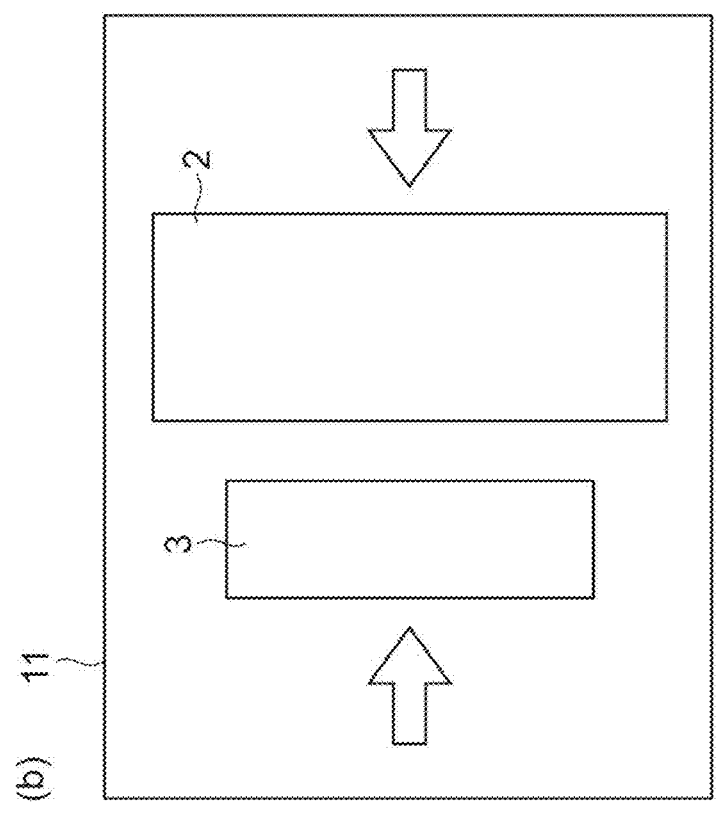
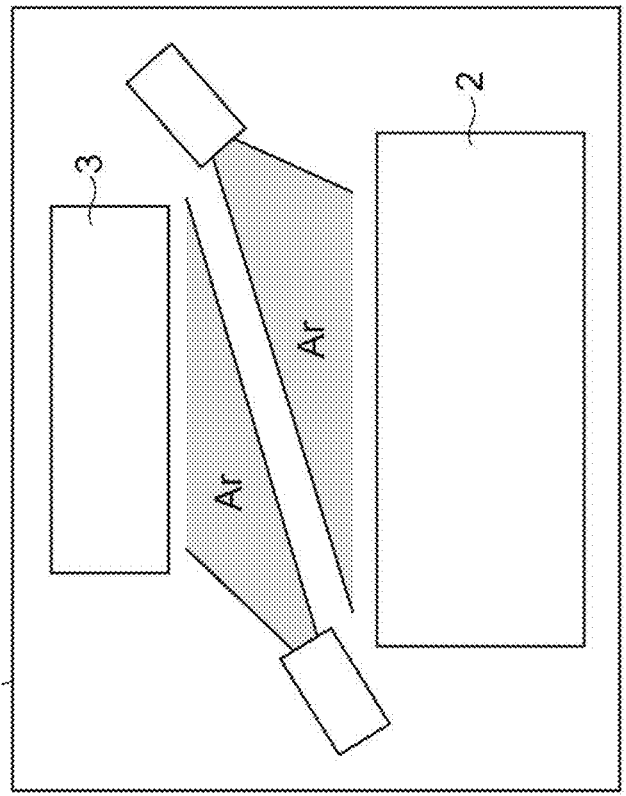

Fig.3
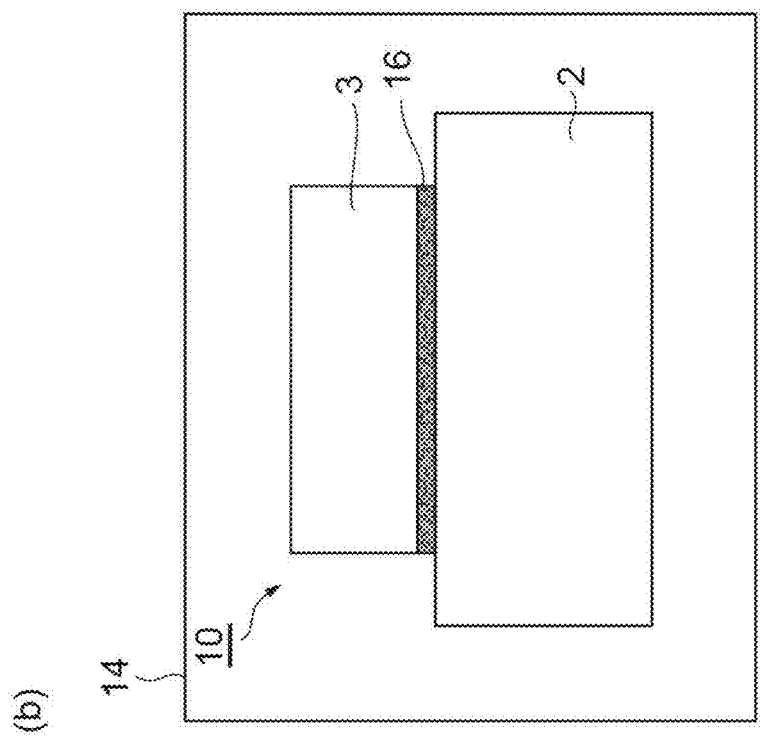
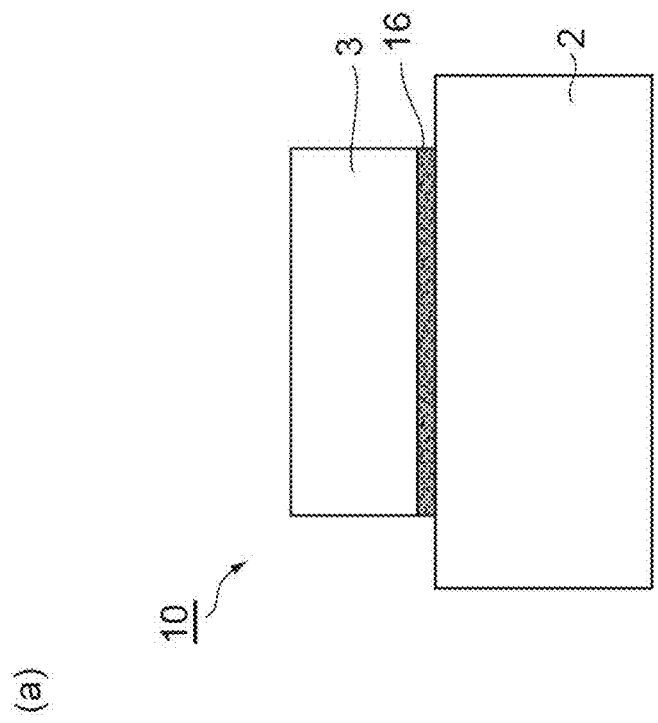

METHOD FOR MANUFACTURING OPTICAL ELEMENT AND OPTICAL ELEMENT

TECHNICAL FIELD

An aspect of the present invention relates to a method for manufacturing an optical element in which laser light is transmitted, reciprocated, or reflected, and such an optical element.

BACKGROUND ART

As a conventional method for manufacturing an optical element, there is known a method of directly bonding a first element part and a second element part, which are transparent to emitted laser light, by surface activity (see, for example, Patent Literature 1). In such a method for manufacturing an optical element, satisfactory bonding between the first element part and the second element part can be achieved by interposing a non-crystalline layer between the first element part and the second element part.

CITATION LIST

Patent Literature

Patent Literature 1: Japanese Patent No. 6245587

SUMMARY OF INVENTION

Technical Problem

In the above-described related art technology, for example, even if the first element part and the second element part are materials of different kinds, bonding of the two can be achieved by interposing a non-crystalline layer as described above. However, since a non-crystalline layer is in a metastable state, the state of matter (bonding state) of the optical element becomes unstable, and for example, there is a possibility that the strength such as optical resistance of the optical element may be insufficient.

An aspect of the present invention was achieved in view of the above-described circumstances, and it is an object of the present invention to provide a method for manufacturing an optical element in which the state of matter can be stabilized, and an optical element.

Solution to Problem

A method for manufacturing an optical element according to an aspect of the present invention is a method for manufacturing an optical element in which laser light is transmitted, reciprocated, or reflected, the method including a first step of obtaining a bonded element formed by subjecting a first element part and a second element part, both element parts being transparent to laser light, to surface activated bonding with a non-crystalline layer interposed therebetween; and after the first step, a second step of raising the temperature of the bonded element so as to crystallize at least a portion of the non-crystalline layer, wherein in the second step, the temperature of the bonded element is raised to a predetermined temperature, the predetermined temperature being lower than the melting points of the first element part and the second element part.

With regard to the method for manufacturing an optical element according to an embodiment of the present invention, the non-crystalline layer is subjected to epitaxial growth by raising the temperature of the bonded element, at least a portion of the non-crystalline layer is crystallized, and the state of matter (bonding state) of the optical element can be stabilized.

With regard to the method for manufacturing an optical element according to an embodiment of the present invention, in the first step, the bonded element may be obtained by irradiating at least any one of the bonded-side surface of the first element part and the bonded-side surface of the second element part with an ion beam or a fast atomic beam in an approximately vacuum environment, and then bringing the surface of the first element part and the surface of the second element part into contact with each other.

With regard to the method for manufacturing an optical element according to an embodiment of the present invention, in the first step, the non-crystalline layer may include at least any one of a beam source element that constitutes the an ion beam or a fast atomic beam and a beam housing material that constitutes the beam housing of an ion beam or a fast atomic beam, as impurities other than the materials constituting the first element part and the second element part. Here, there is concern that when the temperature of the bonded element is raised, stress may be generated at the bonding portion due to the difference in the coefficient of linear expansion, and damage such as detachment may occur in the optical element. In this regard, it is found that when a beam source element and/or a beam housing material is included as impurities in the non-crystalline layer, the temperature required for epitaxial growth at the time of raising temperature can be lowered to a predetermined temperature, which is lower than the melting points of the first element part and the second element part. Thus, in the method for manufacturing an optical element according to an embodiment of the present invention, the non-crystalline layer includes a beam source element and/or a beam housing material, and the temperature of the temperature raising is lowered to a predetermined temperature, which is lower than the melting points of the first element part and the second element part. As a result, the relevant damage of the optical element can be suppressed.

With regard to the method for manufacturing an optical element according to an embodiment of the present invention, the first element part is diamond, silicon carbide, sapphire, garnet including YAG, a vanadate, a sesquioxide, a fluoride, apatite, a tungstate, a silicate, a phosphoric acid-based material, a laser material to which a rare earth ion or a transition metal has been added, an optical switch material, a non-linear optical material, or a functional optical material; the second element part is diamond, silicon carbide, sapphire, garnet including YAG, a vanadate, a sesquioxide, a fluoride, apatite, a tungstate, a silicate, a phosphoric acid-based material, a laser material to which a rare earth ion or a transition metal has been added, an optical switch material, a non-linear optical material, or a functional optical material; and the predetermined temperature of the second step may be a temperature higher than or equal to 100° C. and lower than the melting point of the material constituting the non-crystalline layer. In this case, with regard to an optical element including such a first element part and a second element part, it is possible to stabilize the state of matter of the optical element by raising temperature.

Incidentally, examples of the garnet include oxides such as YAG, YSAG, YGAG, GGG, GSGG, LuAG, and YALO; examples of the vanadate include $VO_4$ compounds such as $YVO_4$, $GdVO_4$, and $LuVO_4$; examples of the sesquioxide include $Y_2O_3$, $Sr_2O_3$, and $Lu_2O_3$; examples of the fluoride include fluorides such as YLF, $SrF_2$, and $CaF_2$; examples of the apatite include phosphoric acid-based calcium compounds such as FAP, SFAP, VAP, and SVAP; and examples of the tungstate include WO4 compounds such as KYW and KGW. The functional optical material is, for example, a material having non-linear susceptibility, an electrooptic effect, or a magnetooptic effect, such as a quartz crystal, LBO, $LiNbO_3$, $KTiPO_4$, ZGP, GaAs, GaP, ZnSe, or ZnS. Regarding ceramics, for example, materials having a Faraday effect, such as TGG (terbium-gallium-garnet), TAG (terbium-aluminum-garnet), and TSAG (terbium-scandium-aluminum-garnet) ceramics may be mentioned.

With regard to the method for manufacturing an optical element according to an embodiment of the present invention, the state of the first element part and the second element part may be a single crystal state, an amorphous state (including glass), or a ceramic state.

With regard to the method for manufacturing an optical element according to an embodiment of the present invention, at least one of the first element part and the second element part may have an optical coating layer at the bonded-side portion thereof, and the predetermined temperature may be 100° C. or higher and 600° C. or lower. As a result, it is also possible to suppress damage to the optical coating layer.

With regard to the method for manufacturing an optical element according to an embodiment of the present invention, the degree of flatness of an interface of a crystallized layer formed by crystallizing the non-crystalline layer in the second step may be higher than the degree of flatness of an interface of the non-crystalline layer. As a result, it is possible to suppress the possibility of any adverse effect exerted by the interface on the laser light that is transmitted, reciprocated, or reflected.

An optical element according to an aspect of the present invention is an optical element in which laser light is transmitted, reciprocated, or reflected, and the optical element includes a first element part and a second element part, both being transparent to laser light; and a crystallized layer interposed between the first element part and the second element part and obtained by crystallization, wherein in the crystallized layer, the elements constituting the first element part are continuously exchanged with the elements constituting the second element part in a 10-nm region along the direction from the first element part side toward the second element part side.

The optical element according to an embodiment of the present invention is an optical element in which laser light is transmitted, reciprocated, or reflected, and the optical element includes a first element part and a second element part, both being transparent to laser light; and a crystallized layer interposed between the first element part and the second element part and obtained by crystallization, wherein the crystallized layer includes at least any one of Ar, Ne, Xe, He, Fe, Ni, and Cr.

In this optical element, not a non-crystalline layer but a crystallized layer is interposed between the first element part and the second element part. The crystallized layer includes at least any one of Ar, Ne, Xe, He, Fe, Ni, and Cr. Accordingly, it is advantageous for recrystallization (not only recrystallization in a temperature raising treatment at a low temperature is facilitated by incorporation of a trace quantity of impurities, but also recrystallization in a short time is enabled with a temperature raising treatment at an ordinary temperature).

The optical element according to an embodiment of the present invention is an optical element in which laser light is transmitted, reciprocated, or reflected, and the optical element includes a first element part and a second element part, both being transparent to laser light; and a crystallized layer interposed between the first element part and the second element part and obtained by crystallization, wherein at least one of the first element part and the second element part has an optical coating layer at the bonded-side portion of the element part, and the elements constituting the first element part or the second element part are continuously exchanged with the elements constituting the optical coating layer in a 10-nm region in the crystallized layer of the first element part or the second element part adjoining the optical coating layer.

With regard to the optical element according to an embodiment of the present invention, at least one of the first element part and the second element part may have an optical coating layer at the bonded-side portion of the element part, and the crystallized layer may include at least any one of Ar, Ne, Xe, He, Fe, Ni, and Cr.

Advantageous Effects of Invention

According to an aspect of the present invention, it is possible to provide a method for manufacturing an optical element, in which the state of matter can be stabilized, and an optical element.

BRIEF DESCRIPTION OF DRAWINGS

FIG. 2(a) is a diagram explaining a method for manufacturing the laser element according to the embodiments. FIG. 2(b) is a diagram explaining a continuation of FIG. 2(a).

FIG. 3(a) is a diagram explaining a continuation of FIG. 2(b). FIG. 3(b) is a diagram explaining a continuation of FIG. 3(a).

DESCRIPTION OF EMBODIMENTS

Figure 1:
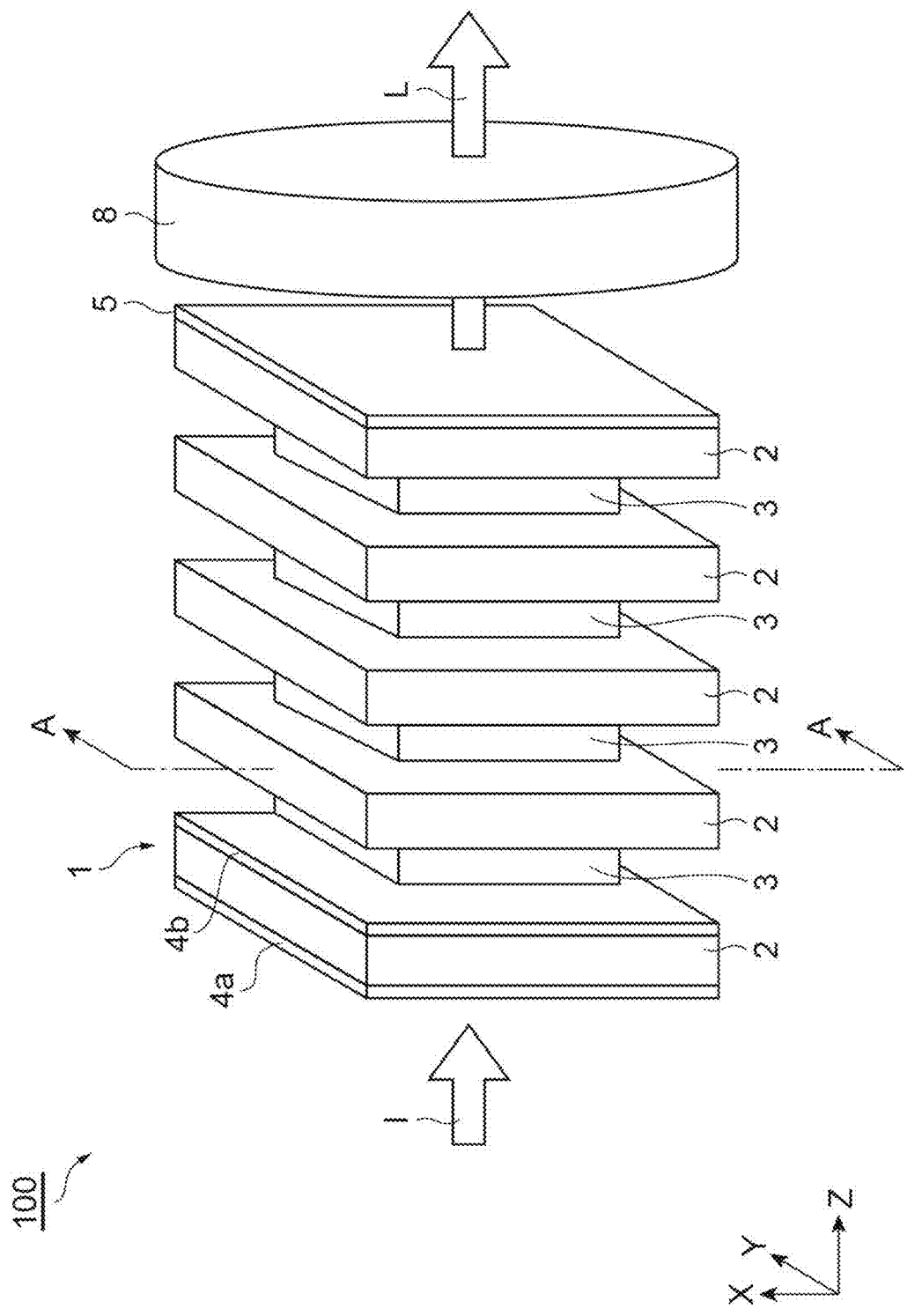
FIG. 1 is a schematic perspective view illustrating a small-sized integrated laser device including a laser element according to embodiments.

Hereinafter, embodiments will be described in detail with reference to the drawings. In the following description, identical or equivalent elements will be assigned with an identical reference numeral, and any overlapping descriptions will not be repeated.

FIG. 1 is a schematic perspective view illustrating a small-sized integrated laser device 100. The small-sized integrated laser device 100 shown in FIG. 1 is a laser light source that emits laser light L, and the laser device is small-sized and convenient and constitutes a high-output power laser as compared to fiber lasers or disc lasers. The small-sized integrated laser device 100 includes a laser element 1 according to the embodiments. In the following description, for convenience, explanations will be given by taking the emission direction (travel direction) of the laser light L as "Z-direction". A cross-section shown in FIG. 2 and after is an XY cross-section, and the in-plane horizontal axis will be referred to as "X-direction", while the in-plane vertical axis will be referred to as "Y-direction". The dimensional ratios of the drawings are not limited to the ratios shown in the diagrams.

First, the configuration of the laser element 1 will be described.

The laser element 1 is an optical element having a DFC structure. The laser element 1 includes a plurality of heat sinks 2, a plurality of laser media 3, a first coating layer 4a, a second coating layer 5, and a third coating layer 4b. The laser element 1 is capable of constituting a high-power microlaser. For instance, in the laser element 1, when diode light of continuous oscillation at a wavelength of 808 nm is input, as excitation light I, along the Z-direction through one end side (left-hand side in the diagram) in the Z-direction, laser light L at a wavelength of 1064 nm is emitted through the other end side (right-hand side in the diagram) in the Z-direction via a Q switch element 8 formed from a saturable absorber. Incidentally, when the laser element 1 does not include the Q switch element 8, it is also possible to constitute a CW (Continuous Wave) laser.

The heat sinks 2 and the laser media 3 present a rectangular late shape having the Z-direction as the thickness direction. For example, a heat sink 2 presents a flat plate shape having a thickness of 1 mm, a longitudinal dimension of 10 mm, and a horizontal direction of 10 mm. For example, a laser medium 3 presents a flat plate shape having a thickness of 1 mm, a longitudinal dimension of 8 mm, and a horizontal direction of 8 mm. The heat sink 2 and the laser medium 3 may present a circular plate shape. The heat sink 2 and the laser medium 3 are disposed so as to be alternately aligned along the Z-direction. That is, a laser medium 3 is located between a pair of adjacent heat sinks 2. The heat sinks 2 and the laser media 3 are bonded without interposing an adhesive therebetween (direct bonding). The portion from the laser medium 3 disposed on one endmost side in the Z-direction to the laser medium 3 disposed on the other endmost side functions as a resonator.

The heat sink 2 is a substance having a thermal conductivity that is of the same extent or higher compared to the laser medium 3. The heat sink 2 has a function of dissipating heat of the laser medium 3. The heat sink 2 constitutes the first element part. The heat sink 2 is diamond, silicon carbide, sapphire, garnet including YAG, a vanadate, a sesquioxide, a fluoride, apatite, a tungstate, a silicate, a phosphoric acid-based material, a laser material to which a rare earth ion or a transition metal has been added, an optical switch material, a non-linear optical material, or a functional optical material. The vanadate is, for example, $YVO_4$ or $LuVO_4$. The functional optical material is, for example, LBO, $LiNbO_3$, $KTiPO_4$, ZGP, GaAs, or GaP. Although it will be described below, the heat sink 2 is an example of the first element part, and the first element part is not limited to the heat sink 2. The state of the first element part may be a single crystal state, an amorphous state (including glass), or a ceramic state.

The laser medium 3 is a substance that forms an inverted population in which amplification exceeds loss in an excited state and amplifies light by utilizing induced emission. The laser medium 3 is also referred to as gain medium. The laser medium 3 constitutes the second element part. The laser medium 3 is diamond, silicon carbide, sapphire, garnet including YAG, a vanadate, a sesquioxide, a fluoride, apatite, a tungstate, a silicate, a phosphoric acid-based material, a laser material to which a rare earth ion or a transition metal has been added, an optical switch material, a non-linear optical material, or a functional optical material. The semiconductor is, for example, ZnS or ZnSe. Although it will be described below, the laser medium 3 is an example of the second element part, and the second element part is not limited to the laser medium 3. The state of the second element part may be a single crystal state, an amorphous state (including glass), or a ceramic state.

The heat sink 2 and the laser medium 3 are transparent to emitted laser light L. Being transparent to laser light L (hereinafter, also simply described as "transparent") means that laser light L is transmitted, and specifically, it is meant that laser light L passes while maintaining its intensity. For example, being transparent as used herein means that the transmittance (net transmittance obtained by deducting Fresnel losses) to laser light L is 95% or higher, and specifically, it is meant that the transmittance is 97% or higher. This also applies to the term transparent in the following description.

The first coating layer 4 is a dielectric multilayer film formed on the surface (face in contact with the atmosphere) on one end side in the heat sink 2 on one end side in the Z-direction. The first coating layer 4 has reflection characteristics of being non-reflective with respect to the excitation light I and being highly reflective with respect to the laser light L. When using the first coating layer 4, the fluctuation of the refractive index between the heat sink 2 on one end side and the atmosphere can be suppressed.

The second coating layer 5 is a dielectric multilayer film formed on the surface (face in contact with the atmosphere) on the other end side in the heat sink 2 on the other end side in the Z-direction. The second coating layer 5 has reflection characteristics of being highly reflective with respect to the excitation light I and being partially reflective with respect to the laser light L. When using the second coating layer 5, the fluctuation of the refractive index between the heat sink 2 on the other end side and the atmosphere can be suppressed. Incidentally, in place of or in addition to at least any one of the first coating layer 4 and the second coating layer 5, various other coating layers may be appropriately provided in the heat sinks 2 and the laser media 3. As a result, the reflection characteristics at the respective interfaces of the heat sinks 2 and the laser media 3 can be regulated as desired.

Figure 4:
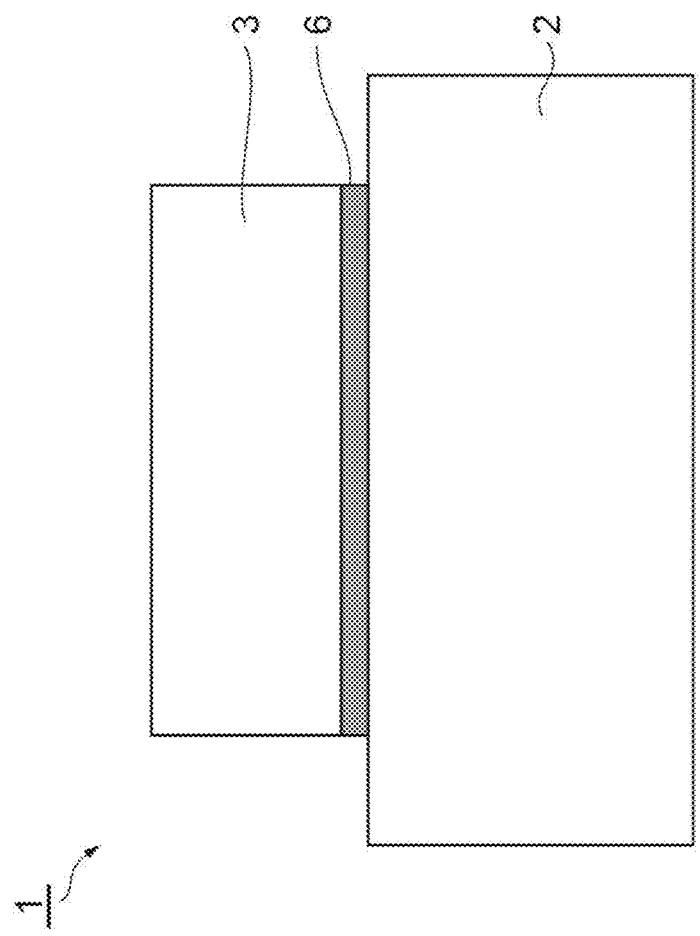
FIG. 4 is a diagram explaining a continuation of FIG. 3(b).

The laser element 1 includes a crystallized layer 6 as shown in FIG. 4, and the crystallized layer 6 is a buffer layer interposed between a heat sink 2 and a laser medium 3. The laser element 1 is a layer formed by crystallization, that is, a layer in a crystalline state. A crystal is a solid substance having a spatially periodic atomic arrangement. A crystal is a substance in which atoms or molecules are arranged in a spatially repeating pattern. Specifically, a crystal is a substance having discrete spatial translational symmetry. The term crystal as used herein includes a quasi-crystal. The crystallized layer 6 is a layer in which the elements constituting the heat sink 2 are gradually reduced (progressively reduced), and at the same time, the elements constituting the laser medium 3 are gradually increased (progressively increased), along the direction from the heat sink 2 side toward the laser medium 3 side (see FIG. 8 to FIG. 11). The crystallized layer 6 is integrated with the heat sink 2 and the laser medium 3. The crystallized layer 6 is transparent to laser light L and transmits laser light L.

Regarding the material of the heat sink and the material of the laser medium, the combinations in the following Table 1 may be mentioned. However, RE represents additive rare earth elements such as Ce, Pr, Nd, Sm, Eu, Tb, Dy, Ho, Er, Tm, and Yb. TM represents additive transition metal elements such as Mg, Ca, Mn, Fe, Co, Ni, Cu, Zn, Cr, Ti, Te, Nb, and V. As will be described below, the heat sink and the laser medium may also be bonded after being subjected to optical coating.

TABLE 1

| Heat sink | Laser medium |
| --- | --- |
| $Al_2O_3$, diamond, SiC, additive-free laser material, Cr:YAG, TM:YAG | RE:RAG (R = Y, Sc, Lu, Gd, etc) |
| | RE:RSiO$_2$ (R = Y, Sc, Lu, Gd) |
| | RE:R$_2$SiO$_5$ (R = Y, Sc, Lu, Gd) |
| | RE:Bi$_4$Si$_3$O$_{12}$ |
| | (R = Y, Ca, Sr, Sc, Lu, Gd) |
| | RE:CaR$_4$(SiO$_4$)$_3$O |
| | (R = Y, La, Ca, Sr, Sc, Lu, Gd) |
| | RE:SrR$_4$(SiO$_4$)$_3$O |
| | (R = Y, La, Ca, Sr, Sc, Lu, Gd) |
| | RE:RAG (R = Y, Sc, Lu, Gd) |

TABLE 1-continued

| Heat sink | Laser medium |
| --- | --- |
| | RE:RAlO$_3$ (R = Y, Sc, Lu, Gd) |
| | RE:RAl$_4$O$_7$ |
| | (R = Y, Ca, Sr, Sc, Lu, Gd) |
| | RE:Y$_3$Sc$_X$Al$_{(5-X)}$O$_{12}$ |
| | RE:RVO$_4$ (R = Y, Sc, Lu, Gd) |
| | RE:(s)FAP or RE:(s)VAP |
| | RE:RCOB (R = Y, Sc, Lu, Gd) |
| | RE:RLF (R = Y, Lu, or the like) |
| | RE:CaF$_2$, SrF$_2$, or the like |

Next, the method for manufacturing the laser element 1 will be described.

In the method for manufacturing the laser element 1, roughly, first, a plurality of heat sinks 2 and a plurality of laser media 3 are prepared. A first coating layer 4 and a second coating layer 5 are appropriately formed on the heat sinks 2. For this film forming, various known film-forming techniques can be employed. Subsequently, as a bonding step (first step), while the heat sinks 2 and the laser media 3 are disposed to be alternately aligned, the heat sinks 2 and the laser media 3 are directly bonded, with a non-crystalline layer 16 interposed therebetween, and a bonded element is obtained. Then, as a temperature raising step (second step), at least a portion of the non-crystalline layer 16 is crystallized by raising the temperature of this bonded element.

Hereinafter, the bonding step and the temperature raising step will be explained in detail. FIG. 2(a), FIG. 2(b), and FIG. 3(a) are each a diagram for explaining the bonding step. FIG. 3(b) and FIG. 4 are each a diagram for explaining the temperature raising step. In the following description, for the convenience of explanation, bonding of one heat sink 2 and one laser medium 3 will be described as an example. Furthermore, the heat sink 2 and the laser medium 3 are shown at a cross-section cut along the line A-A in FIG. 1; however, this cross-section is not subjected to hatching (the same applies to other cross-sections as well).

As show in FIG. 2(a), a heat sink 2 and a laser medium 3 are disposed inside a chamber 11, and the inside of the chamber 11 is brought to an approximately vacuum environment. The heat sink 2 and the laser medium 3 are bonded by surface activated bonding. Surface activated bonding is a technique of removing an oxide film or surface deposits at the bonding surfaces of materials to be bonded, by ion beam irradiation or FAB (fast atomic beam) irradiation in a vacuum, and bonding the bonding surfaces that are flat and have the constituent atoms exposed thereon. Surface activated bonding is direct bonding that utilizes intermolecular coupling. In the surface activated bonding, the bonding temperature can be lowered to a large extent as compared to other bonding techniques.

Specifically, the bonded-side surface of the heat sink 2 and the bonded-side surface of the laser medium 3 are irradiated with an ion beam or a FAB (fast atomic beam) of argon (Ar) or the like in an approximately vacuum environment. As a result, oxygen and the like adsorbed to the surfaces are removed, and newly formed surfaces including dangling bonds are formed. This approximately vacuum environment is, for example, a vacuum or reduced pressure atmosphere at a background pressure of $1 \times 10^{-6}$ Pa or higher and lower than the atmospheric pressure.

As the ion beam or FAB, a noble gas or an inert gas, such as neon (Ne), krypton (Kr), xenon (Xe), or helium (He), can be employed in addition to argon. Since noble gases are not likely to cause chemical reactions, noble gases do not greatly change the chemical properties of the surfaces to be irradiated. By accelerating the particles of an ion beam toward the bonding surface using a particle beam source or a plasma generating device, predetermined kinetic energy can be applied to the into the ion beam or FAB.

As shown in FIG. 2(b), the bonded side of the heat sink 2 and the bonded side of the laser medium 3 are disposed to face each other. At room temperature, newly formed surfaces of the heat sink 2 and the laser medium 3, where coupling bonds are exposed, are brought into contact with each other in an approximately vacuum environment. As a result, as shown in FIG. 3(b), bonding force caused by an interaction between atoms is generated, and a bonded element 10 in which the heat sink 2 and the laser medium 3 are strongly coupled, with a non-crystalline layer 16 interposed therebetween, is obtained. This approximately vacuum environment is, for example, a vacuum or reduced pressure atmosphere having a background pressure of $1.5 \times 10^{-6}$ Pa or less. A predetermined pressure (1.5 to 2.0 MPa) may be applied to the heat sink 2 and the laser medium 3, which have been brought into contact.

The non-crystalline layer 16 is a layer in a non-crystalline state. The non-crystalline layer 16 is a buffer layer interposed between a heat sink 2 and a laser medium 3 in the bonded element 10. The term non-crystalline (amorphous) refers to a substance that does not have long-range order as is the case of a crystal, but has short-range order. The term non-crystalline refers to a substance in a state in which the crystal structure has collapsed. The non-crystalline layer 16 is a layer in which crystallinity is lower than a certain level. The non-crystalline layer 16 is transparent to laser light L and transmits laser light L.

The non-crystalline layer 16 includes, as impurities other than the substances constituting the heat sink 2 and the laser medium 3, a beam source element constituting an ion beam or FAB, and a beam housing material constituting the beam housing of an ion beam or FAB. The beam source element is, for example, Ar (argon) or Ne (neon). The beam housing material is, for example, Fe (iron), Ni (nickel), or Cr (chromium). The amount of the beam source element include in the non-crystalline layer 16 is a very small amount such as not to affect the oscillation of the laser light L.

As shown in FIG. 3(b), the bonded element 10 is disposed inside a heating furnace 14, the bonded element 10 is subjected to a heating treatment, and the temperature of the bonded element 10 is raised to a predetermined temperature. As a result, the bonded element 10 is annealing-treated, and the non-crystalline layer 16 of the bonded element 10 is subjected to epitaxial growth and is crystallized. As a result, the laser element 1 shown in FIG. 4 is obtained.

The predetermined temperature for temperature raising (also referred to as crystallization temperature or epitaxial growth temperature) is a temperature lower than the melting points of the heat sink 2 and the laser medium 3. The predetermined temperature for temperature raising is a temperature that is 100° C. or higher and lower than the melting point of the substance constituting the non-crystalline layer 16. The predetermined temperature for temperature raising is about 865° C., which is about a half of approximately 2000° C., which is the melting point of the heat sink 2 and the laser medium 3. The predetermined temperature for temperature raising is 1900° C. or lower, which is the melting point of garnet without coating. When garnet is provided with a coating (for example, the optical coating layer 12 that will be described below (see FIG. 15)), the predetermined temperature for temperature raising is a low temperature such as not to affect the coating and is 200° C., 300° C., or the like. The heating time for the bonded element 10 is, for example, several hours to several dozen hours. For example, in the case of a temperature raising treatment for a long time period, the predetermined temperature for temperature raising may be 100° C. or lower. Incidentally, as an example of the melting points of different materials, for example, the temperatures shown in Table 2 may be mentioned.

TABLE 2

| | Melting point (° C.) |
|---|---|
| $Y_2O_3$ | 2,430 |
| $YAlO_3$ | 1,850 |
| $Y_3Al_5O_{12}$ | 1,930 |
| $Al_2O_3$ | 2,040 |
| $LiYF_4$ | 825 |
| $BeAl_2O_4$ | 1,870 |

Figure 5:
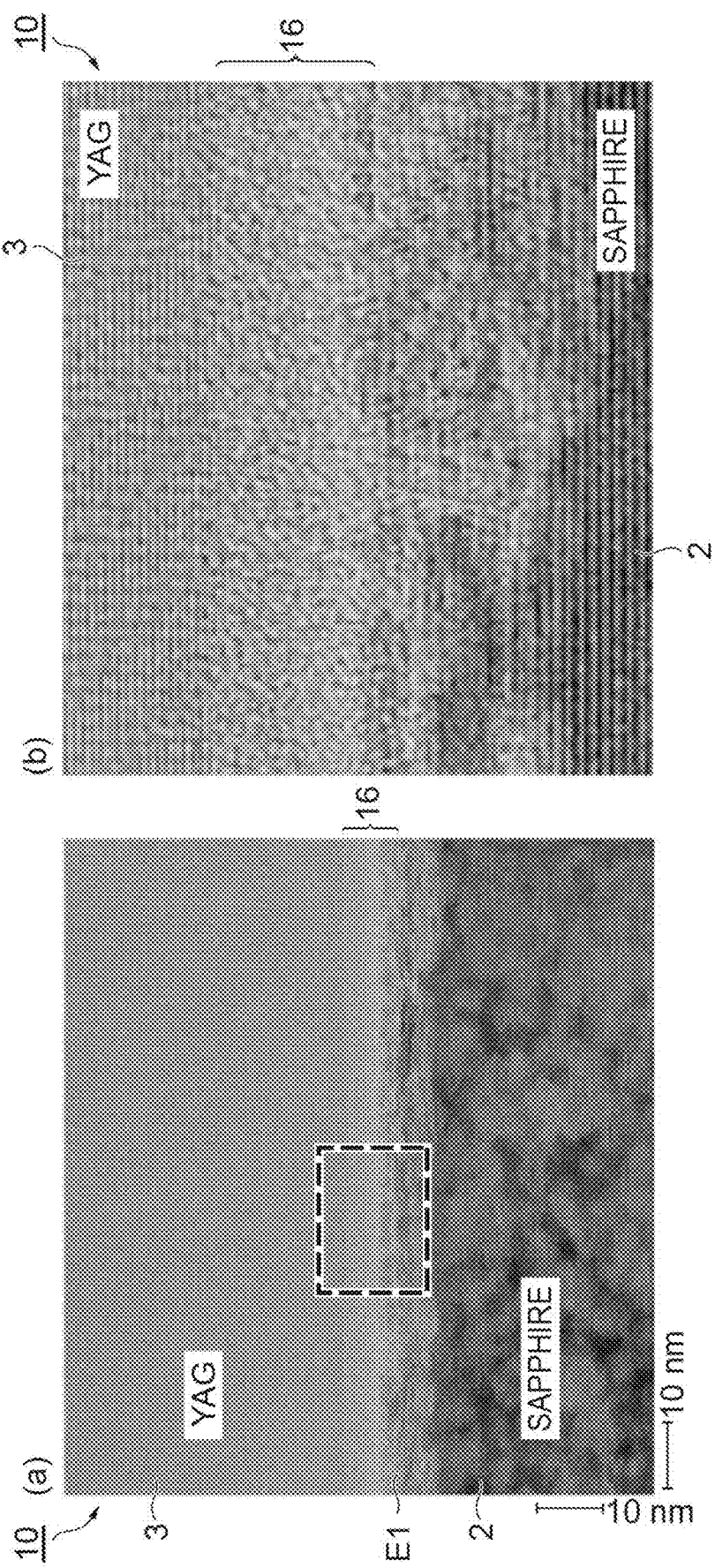
FIG. 5(a) is a diagram showing the periphery of a bonding portion of the bonded element according to the embodiments.
FIG. 5(b) is a magnified view showing the inside of the broken line frame of FIG. 5(a).
Figure 6:
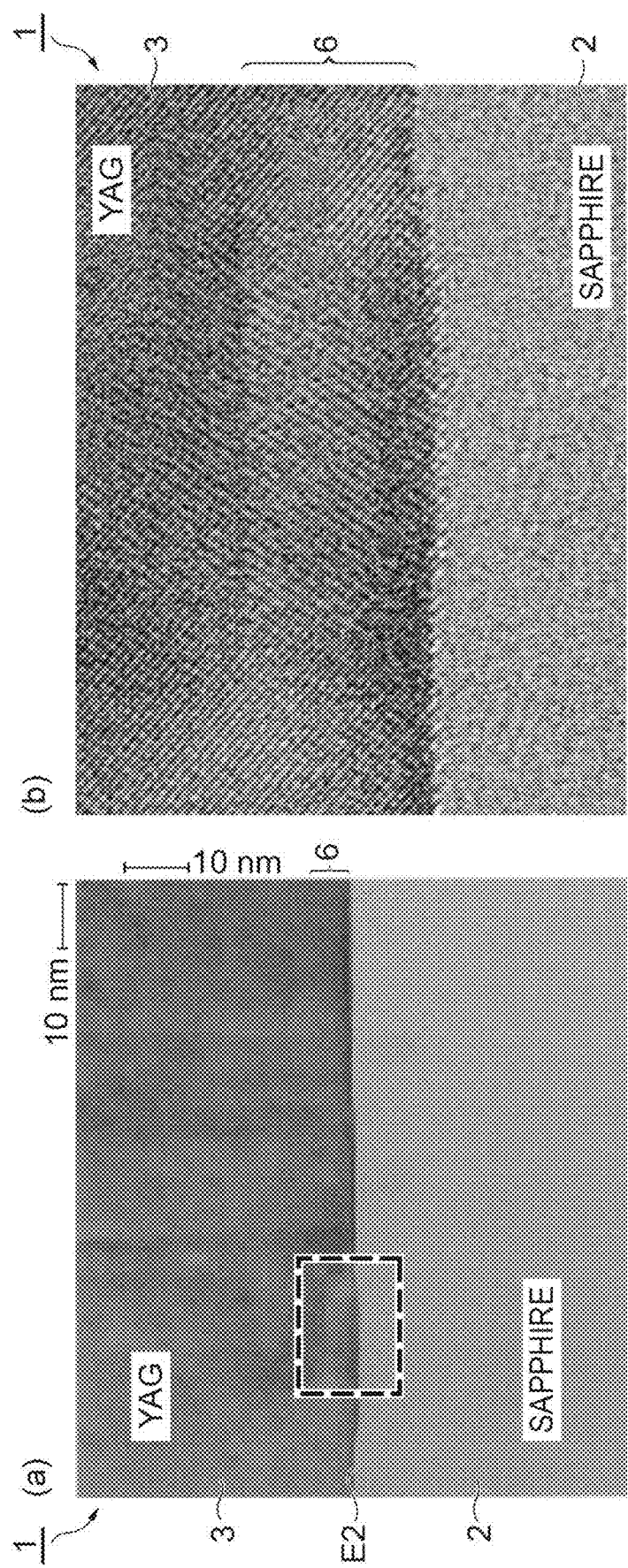
FIG. 6(a) is a diagram showing the periphery of a bonding portion of a laser element according to embodiments.
FIG. 6(b) is a magnified view showing the inside of the broken line frame of FIG. 6(a).
Figure 7:
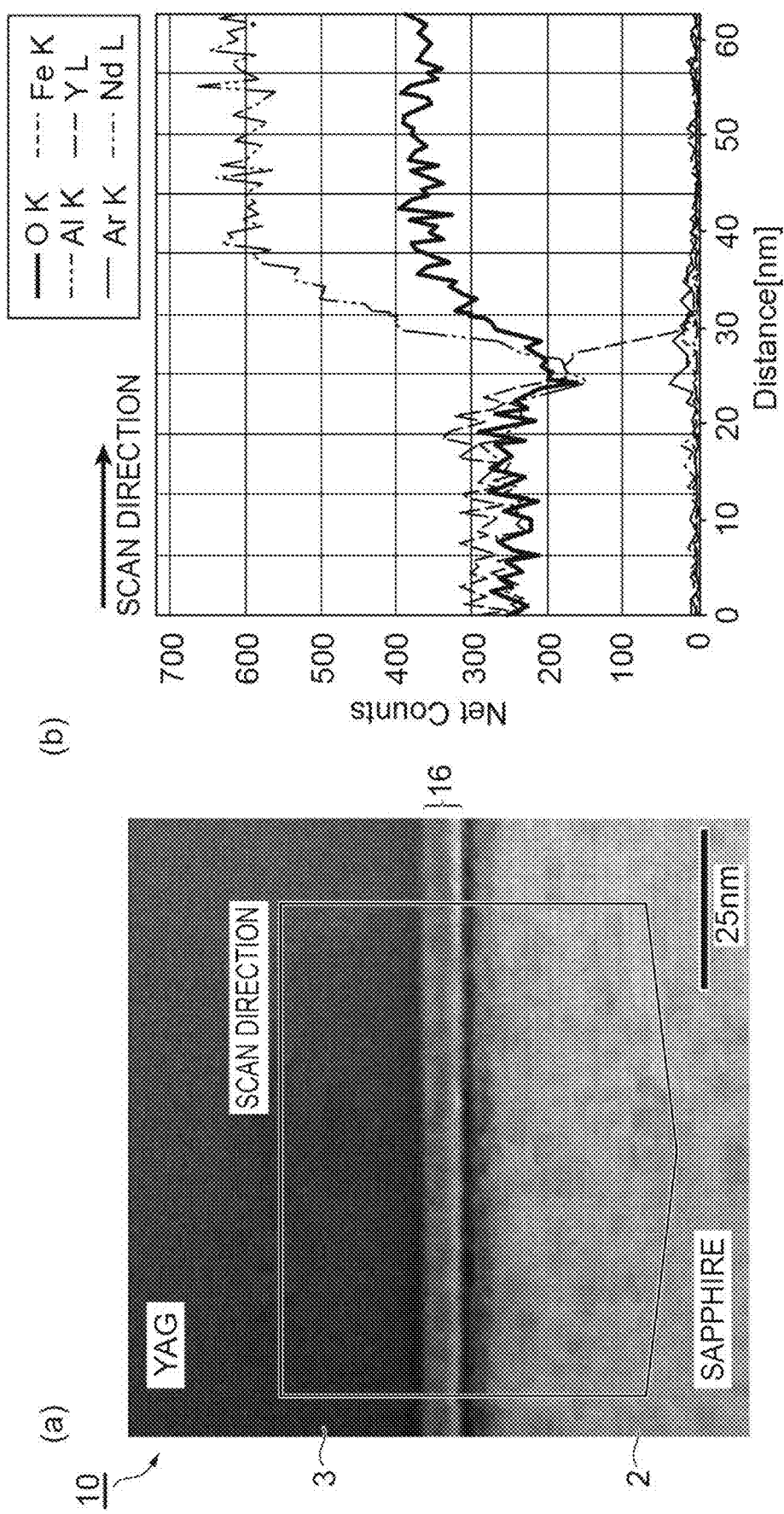
FIG. 7(a) is a diagram showing the periphery of a bonding portion of the bonded element according to the embodiments.
FIG. 7(b) is a graph showing the elements detected inside the frame of FIG. 7(a).
Figure 8:
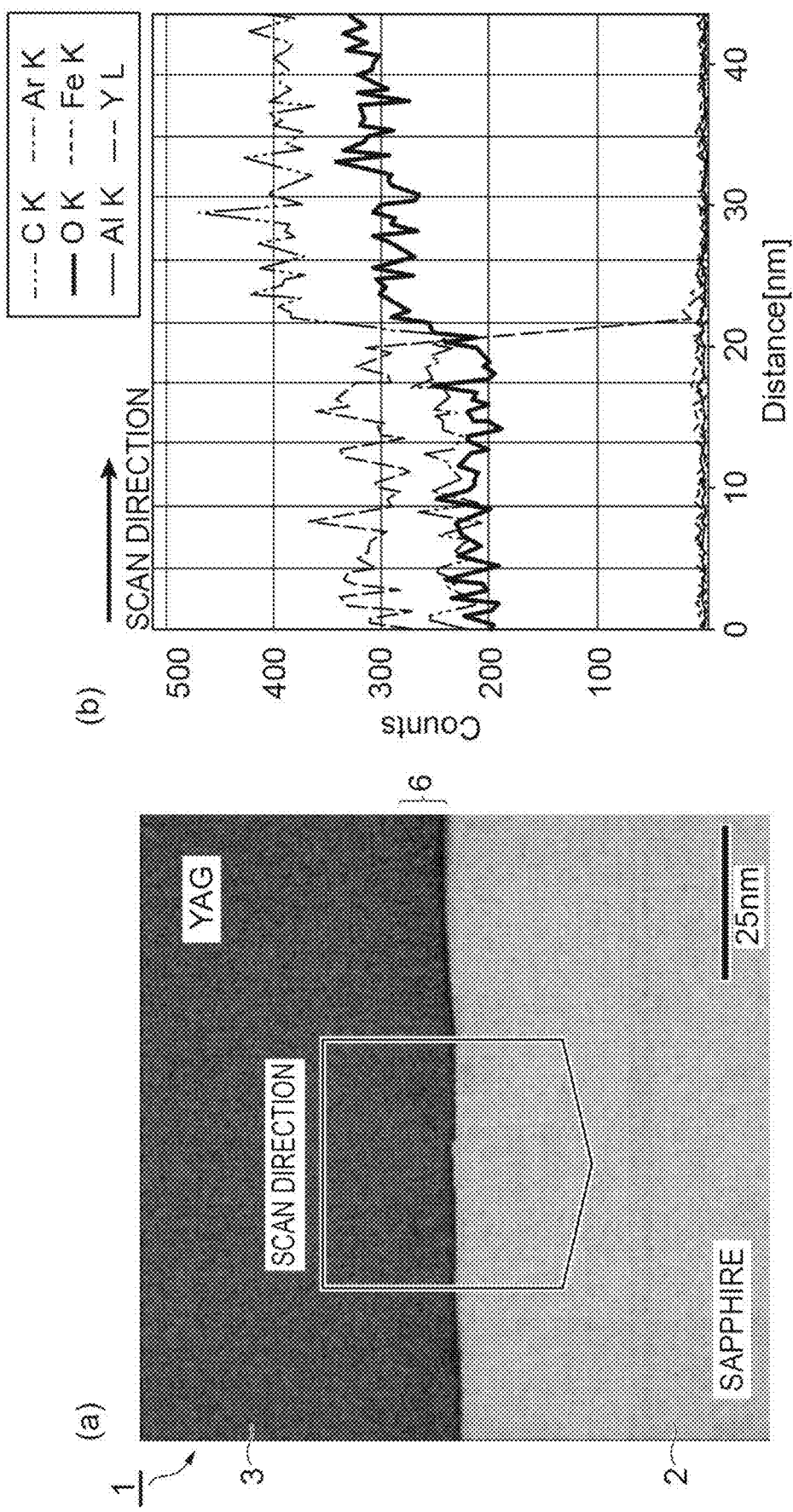
FIG. 8(a) is a diagram showing the periphery of a bonding portion of the laser element according to the embodiments.
FIG. 8(b) is a graph showing the elements detected inside the frame of FIG. 8(a).
Figure 9:
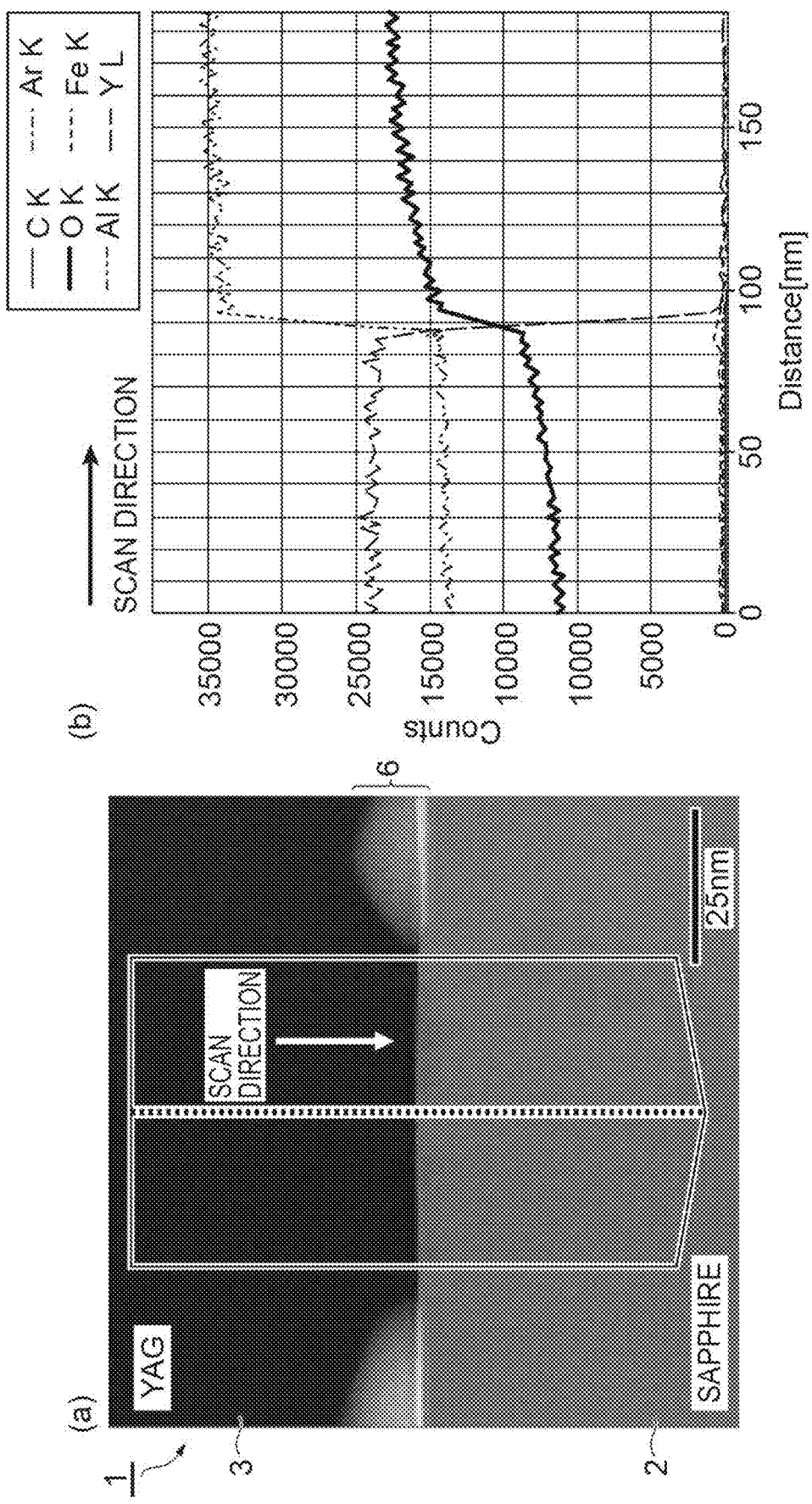
FIG. 9(a) is a diagram showing the periphery of the bonding portion of the laser element according to the embodiments.
FIG. 9(b) is a graph showing the elements detected inside the frame of FIG. 9(a).
Figure 10:
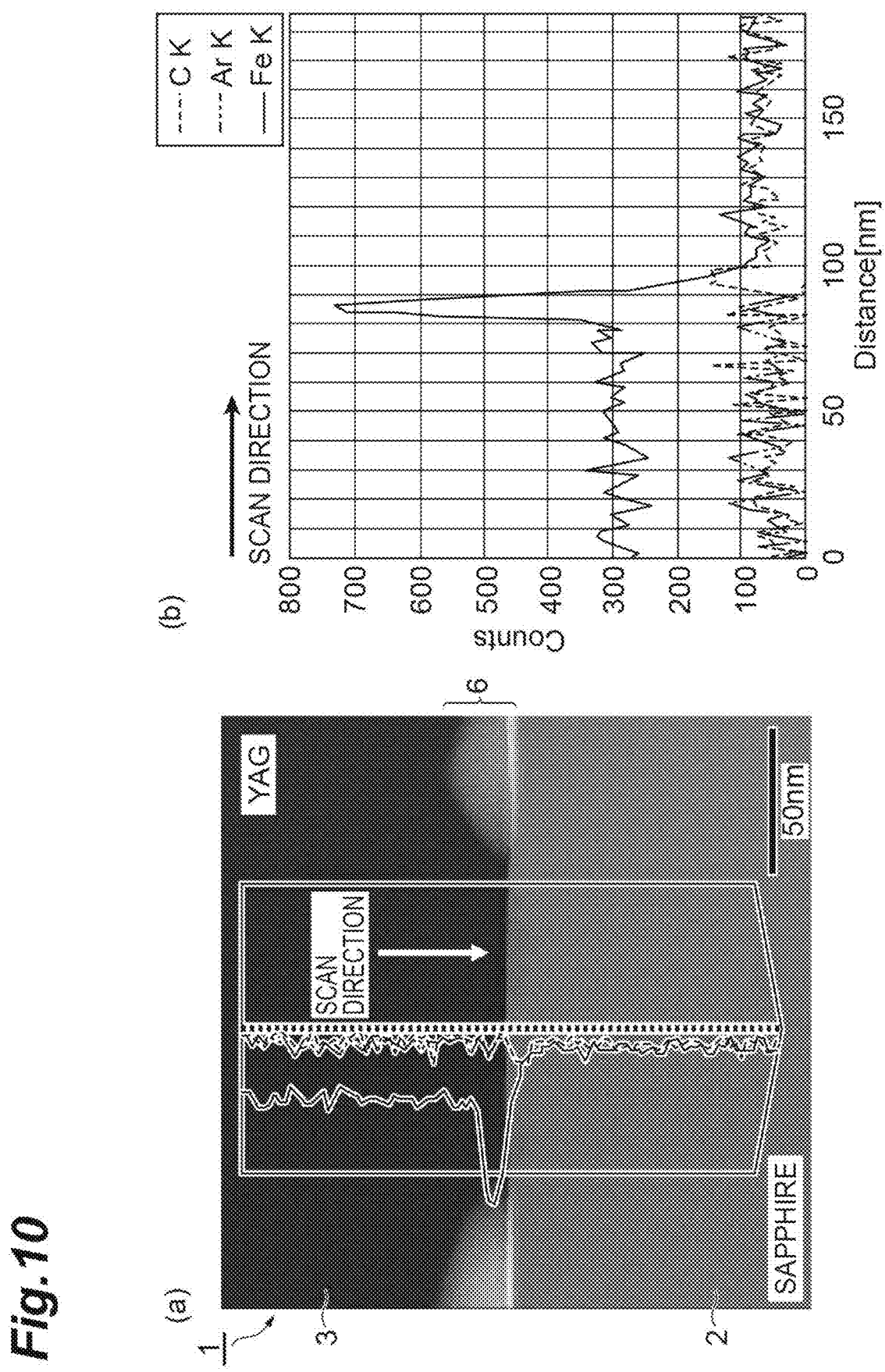
FIG. 10(a) is a diagram showing the periphery of the bonding portion of the laser element according to the embodiments.
FIG. 10(b) is a graph showing the elements detected inside the frame of FIG. 10(a).
Figure 11:
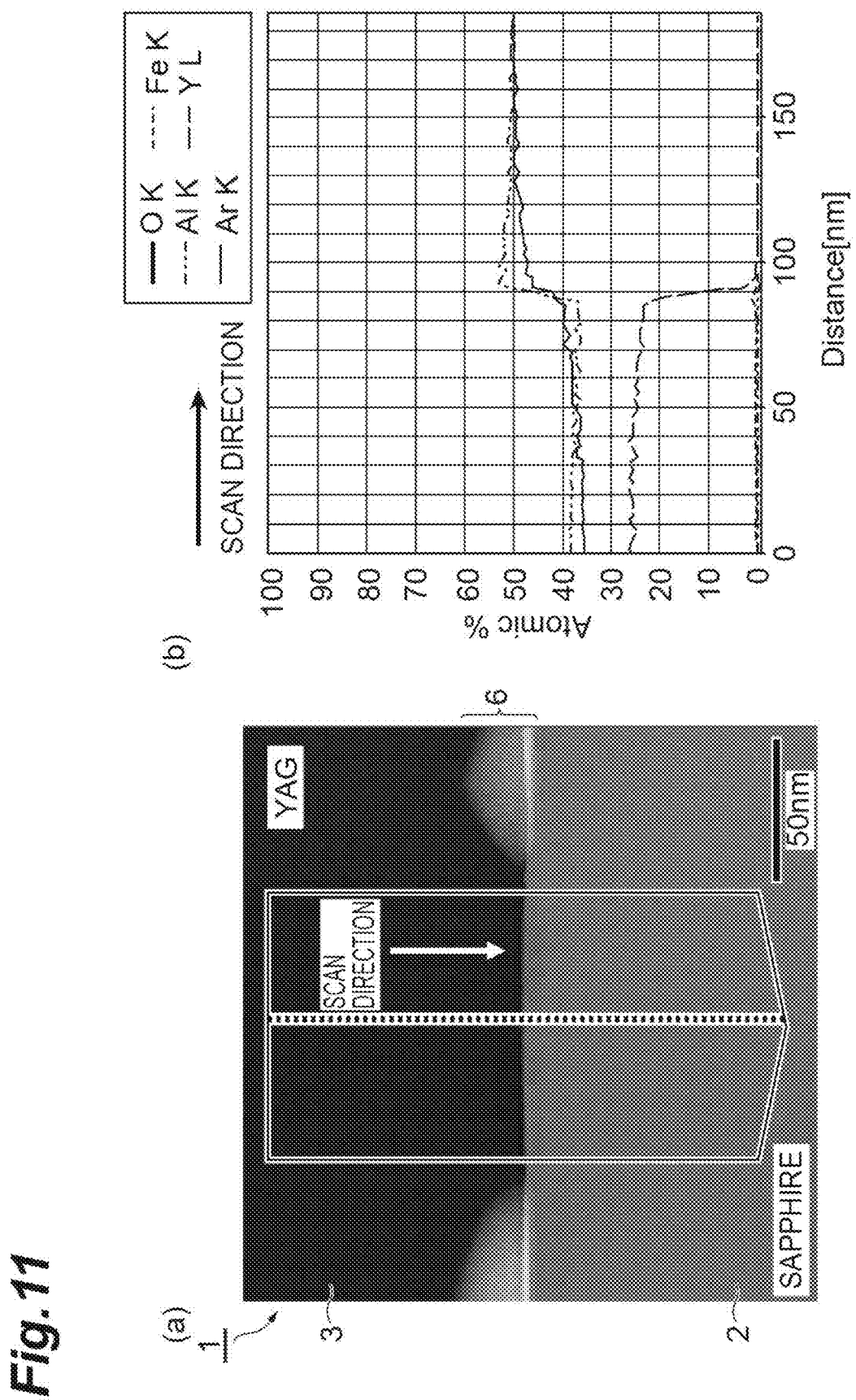
FIG. 11(a) is a diagram showing the periphery of the bonding portion of the laser element according to the embodiments.
FIG. 11(b) is a graph showing the elements detected inside the frame of FIG. 11(a).

FIG. 5(a) is a diagram showing the periphery of the bonding portion of the bonded element 10, which is an element before the temperature raising step. FIG. 5(b) is a magnified view showing the inside of the broken line frame of FIG. 5(a). In the sample shown in FIG. 5(a) and FIG. 5(b), sapphire was used for the heat sink 2, and Nd:YAG (hereinafter, Nd:YAG in the diagram will be simply referred to as "YAG") was used for the laser medium 3 (the same applies to the following FIG. 6 to FIG. 11). The diagrams of FIG. 5(a) and FIG. 5(b) are EDX (Energy dispersive X-ray spectroscopy) data (the same applies to the following FIG. 6 to FIG. 14). As shown in FIG. 5(a) and FIG. 5(b), it can be confirmed that in the bonded element 10, the non-crystalline layer 16 is interposed between the heat sink 2 and the laser medium 3.

FIG. 6(a) is a diagram showing the periphery of the bonding portion of a laser element 1, which is an element after the temperature raising step. FIG. 6(b) is a magnified view showing the inside of the broken line frame of FIG. 6(a). The laser element 1 of FIG. 6(a) and FIG. 6(b) is obtained by raising the temperature of the bonded element 10 at 1000° C. for 3 h. As shown in FIG. 6(a) and FIG. 6(b), it can be confirmed that in the laser element 1, the non-crystalline layer 16 is crystallized in the temperature raising step, and a crystallized layer 6 is interposed between the heat sink 2 and the laser medium 3. In the laser element 1, a boundary between the heat sink 2 and the laser medium 3 is clearly present.

Furthermore, in the method for manufacturing the laser element 1, as shown in FIG. 5(a), the non-crystalline layer 16 has an interface E1 between the non-crystalline layer 16 and the heat sink 2. As shown in FIG. 6(a), the crystallized layer 6 formed by crystallizing the non-crystalline layer 16 has an interface E2 between the crystallized layer 6 and the heat sink 2. As shown in FIG. 5(a) and FIG. 6(a), the degree of planarity of the interface E2 is higher than the degree of planarity of the interface E1. The degree of planarity can be defined as, for example, as the magnitude of warp from a plane. The degree of planarity can be expressed as, for example, the distance between the most protruding portion and the most depressed portion.

FIG. 7(a) is a diagram showing the periphery of the bonding portion of the bonded element 10, which is an element before the temperature raising step. FIG. 7(b) is a graph showing the elements detected inside the frame of FIG. 7(a). In the graph of FIG. 7(b), the axis of ordinate represents the amount of measurement signal corresponding the quantity of elements, and the axis of abscissa represents the scan distance. The scan direction in the graph of FIG. 7(b) corresponds to a direction from the top toward the bottom in FIG. 7(a). The description of the graph of FIG. 7(b) is the same as that for FIG. 8(b), FIG. 9(b), and FIG. 10(b).

As shown in FIG. 7(b), it can be confirmed that in the range where the non-crystalline layer 16 is present (25 nm to 40 nm), the elements constituting the heat sink 2 are gradually reduced, and at the same time, the elements constituting the laser medium 3 are gradually increased, along the direction from the heat sink 2 side toward the laser medium 3 side. Furthermore, it can be confirmed that in the range where the non-crystalline layer 16 is present (25 nm to 40 nm), slight amounts of Fe and Ar are included as impurities other than the substances constituting the heat sink 2 and the laser medium 3.

FIG. 8(a) is a diagram showing the periphery of the bonding portion of the laser element 1, which is an element after the temperature raising step. FIG. 8(b) is a graph showing the elements detected in the frame of FIG. 8(a). The laser element 1 of FIG. 8(a) and FIG. 8(b) are obtained by raising the temperature of the bonded element 10 at 1000° C. for 3 h. As shown in FIG. 8(b), it can be confirmed that in the range where the crystallized layer 6 is present (20 nm to 23 nm), the elements constituting the heat sink 2 are gradually reduced, and at the same time, the elements constituting the laser medium 3 are gradually increased, along the direction from the heat sink 2 side toward the laser medium 3 side.

FIG. 9(a) is a diagram showing the periphery of the bonding portion of the laser element 1, which is an element after the temperature raising step. FIG. 9(b) is a graph showing the elements detected inside the frame of FIG. 9(a). The laser element 1 of FIG. 9(a) and FIG. 9(b) is obtained by raising the temperature of the bonded element 10 at 1000° C. for 3 h. The results of FIG. 9(b) are analysis results of higher resolution than the results of FIG. 8(b). As shown in FIG. 9(b), it can be confirmed that in the range where the crystallized layer 6 is present (80 nm to 95 nm), along the direction from the heat sink 2 side toward the laser medium 3 side, the elements constituting the heat sink 2 are gradually reduced, and at the same time, the elements constituting the laser medium 3 are gradually increased.

FIG. 10(a) is a diagram showing the periphery of the bonding portion of the laser element 1, which is an element after the temperature raising step. FIG. 10(b) is a graph showing the elements detected inside the frame of FIG. 10(a). The laser element 1 of FIG. 10(a) and FIG. 10(b) is obtained by raising the temperature of the bonded element 10 at 1000° C. for 3 h. The results of FIG. 10(b) show C (carbon), Ar, and Fe among the results of FIG. 9(b). The graph of FIG. 10(b) is superposed at the position corresponding to "Distance" of FIG. 10(b) on FIG. 10(a).

As shown in FIG. 10(b), it can be confirmed that in the range where the crystallized layer 6 is present (80 nm to 95 nm), at least any one of Ar, Ne, Xe, He, Fe, Ni, and Cr (beam source elements constituting an ion beam or a fast atomic beam) and at least any one of the beam housing materials constituting the beam housing of an ion beam or a neutral fast atomic beam (at least any one of Cr, Ar, and Fe) are included as impurities other than the substances constituting the heat sink 2 and the laser medium 3. Particularly, it can be confirmed that Fe is segregated in the range of about 10 nm from the vicinity of the interface between the heat sink 2 and the laser medium 3 to the laser medium 3 side (YAG side).

FIG. 11(a) is a diagram showing the periphery of the bonding portion of the laser element 1, which is an element after the temperature raising step. FIG. 11(b) is a graph showing the elements detected inside the frame of FIG. 11(a). The laser element 1 of FIG. 11(a) and FIG. 11(b) is obtained by raising the temperature is obtained by raising the temperature of the bonded element 10 at 1000° C. for 3 h. The results of FIG. 11(b) are analysis results of higher resolution than the results of FIG. 8(b). In the graph of FIG. 11(b), the axis of ordinate represents the amount of measurement signal corresponding the quantity of elements, and the axis of abscissa represents the scan distance. The scan direction in the graph of FIG. 11(b) corresponds to a direction from the top toward the bottom in FIG. 11(a). As shown in FIG. 11(b), it can be confirmed that in the range where the crystallized layer 6 is present (85 nm to 95 nm), the elements constituting the heat sink 2 are gradually reduced, and the elements constituting the laser medium 3 are gradually increased, along the direction from the heat sink 2 side toward the laser medium 3 side.

Figure 12:
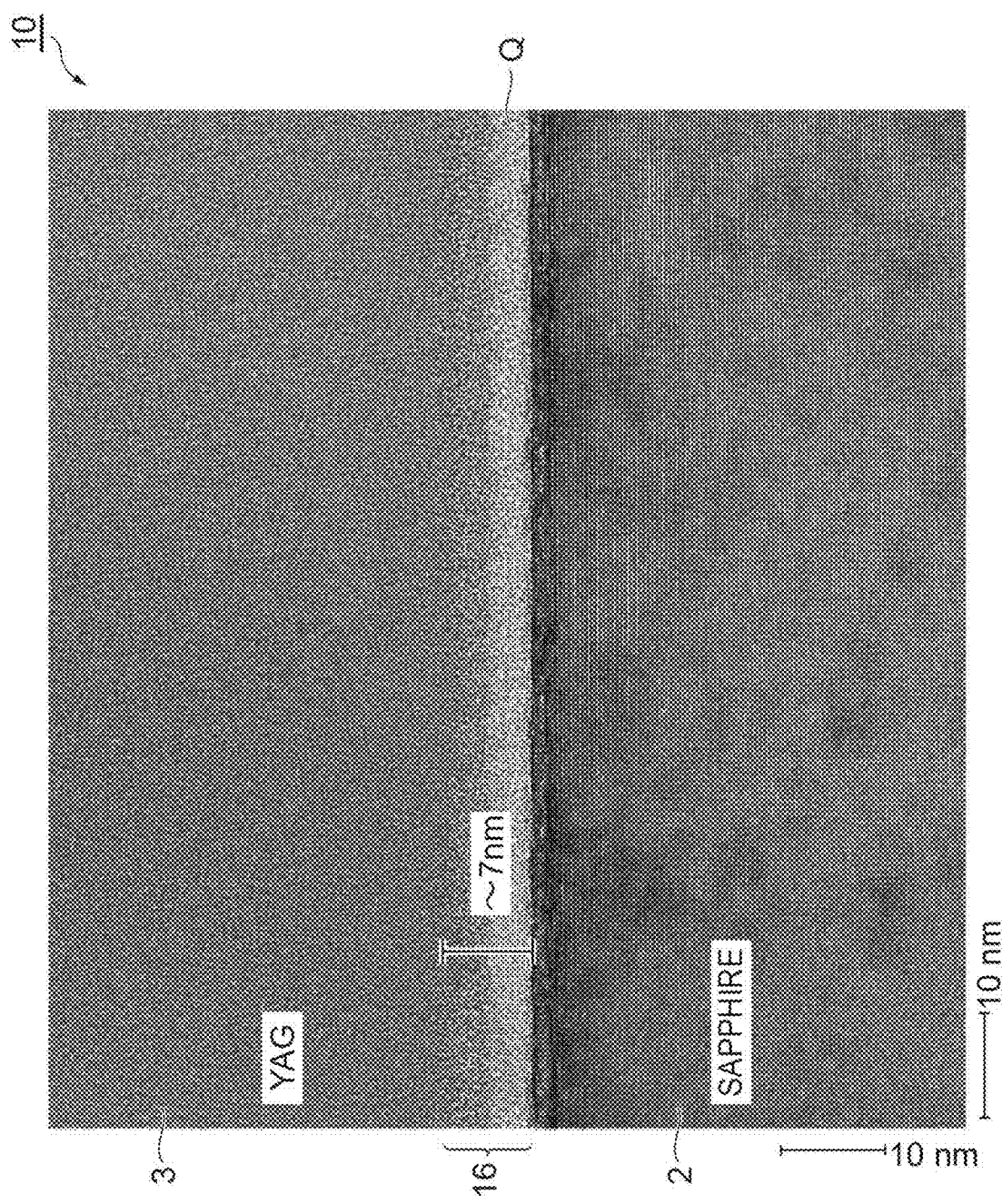
FIG. 12 is a diagram showing the periphery of the bonding portion of the bonded element according to the embodiments.

FIG. 12 is a diagram showing the periphery of the bonding portion of the bonded element 10, which is an element before the temperature raising step. In the sample shown in FIG. 12, sapphire was used for the heat sink 2, and ceramic YAG was used for the laser medium 3 (the same applies to the following FIG. 13 and FIG. 14). As shown in FIG. 12, it can be confirmed that in the bonded element 10, a non-crystalline layer 16 having a thickness of 7 nm or less is interposed between the heat sink 2 and the laser medium 3. Furthermore, in this case, an unidentified layer Q is present in the vicinity of the interface between the heat sink 2 and the laser medium 3.

Figure 13:
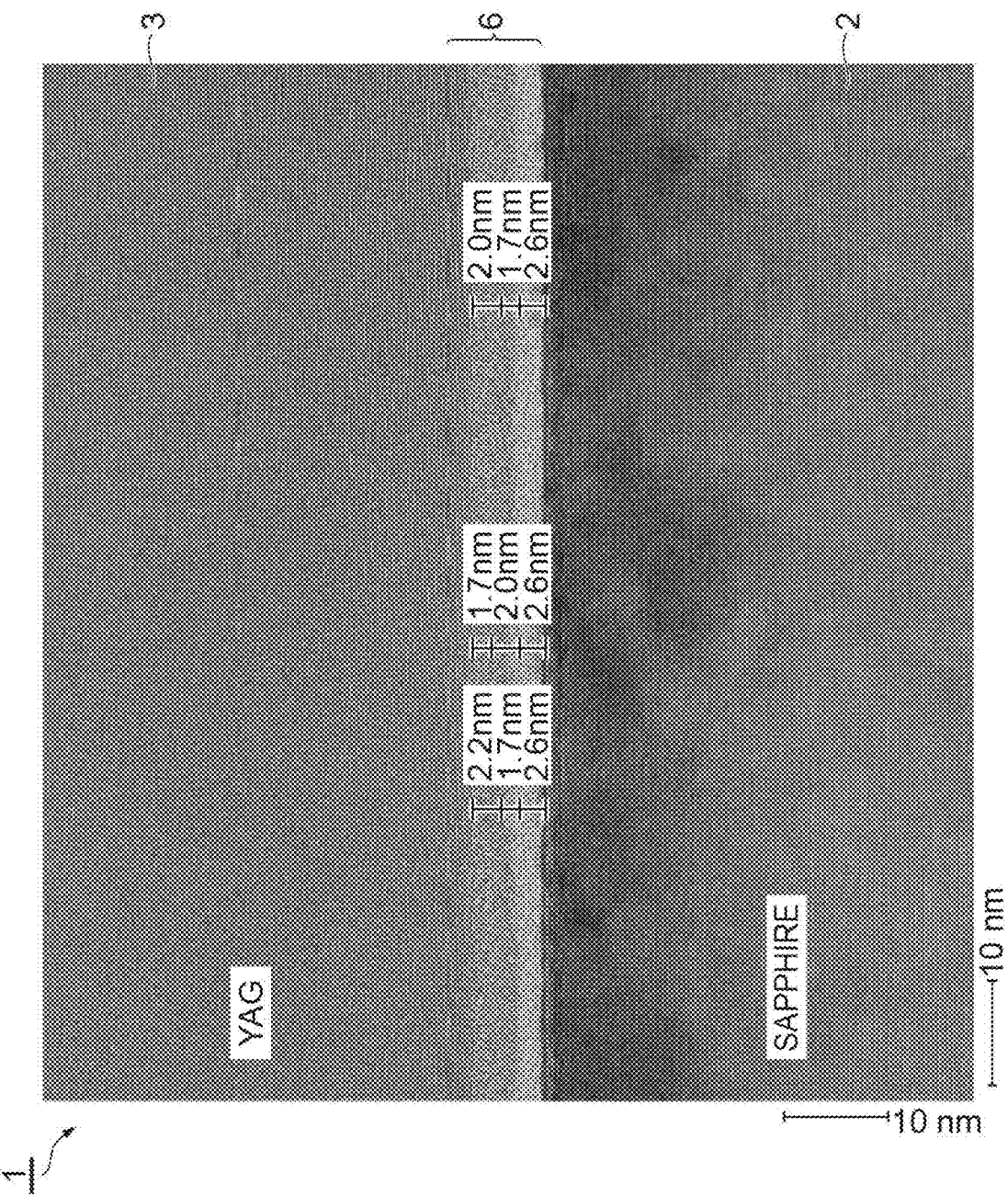
FIG. 13 is a diagram showing the periphery of the bonding portion of the laser element according to the embodiments.

FIG. 13 is a diagram showing the periphery of the bonding portion of the laser element 1, which is an element after the temperature raising step. The laser element 1 of FIG. 13 is obtained by raising the temperature of the bonded element 10 at 100° C. for 10 h. In the laser element 1 of FIG. 13, crystallization of the non-crystalline layer 16 is in progress. As shown in FIG. 13, it can be confirmed that a crystallized layer 6 is interposed between the heat sink 2 and the laser medium 3.

It can be further confirmed that the crystallized layer 6 is configured in a layered form, such as including a plurality of layers. In this case, the crystallized layer 6 includes, at a certain site, a 2.6-nm thick layer, a 1.7-nm thick layer, and a 2.2-nm thick layer from the heat sink 2 side toward the laser medium 3 side. The crystallized layer 6 includes, at another site, a 2.6-nm thick layer, a 2.0-nm thick layer, and a 1.7-nm thick layer from the heat sink 2 side toward the laser medium 3 side. The crystallized layer 6 includes, at still another site, a 2.6-nm thick layer, a 1.7-nm thick layer, and a 2.0-nm thick layer from the heat sink 2 side toward the laser medium 3 side. The progression coefficient of crystallization is 0.5 nm/h.

Figure 14:
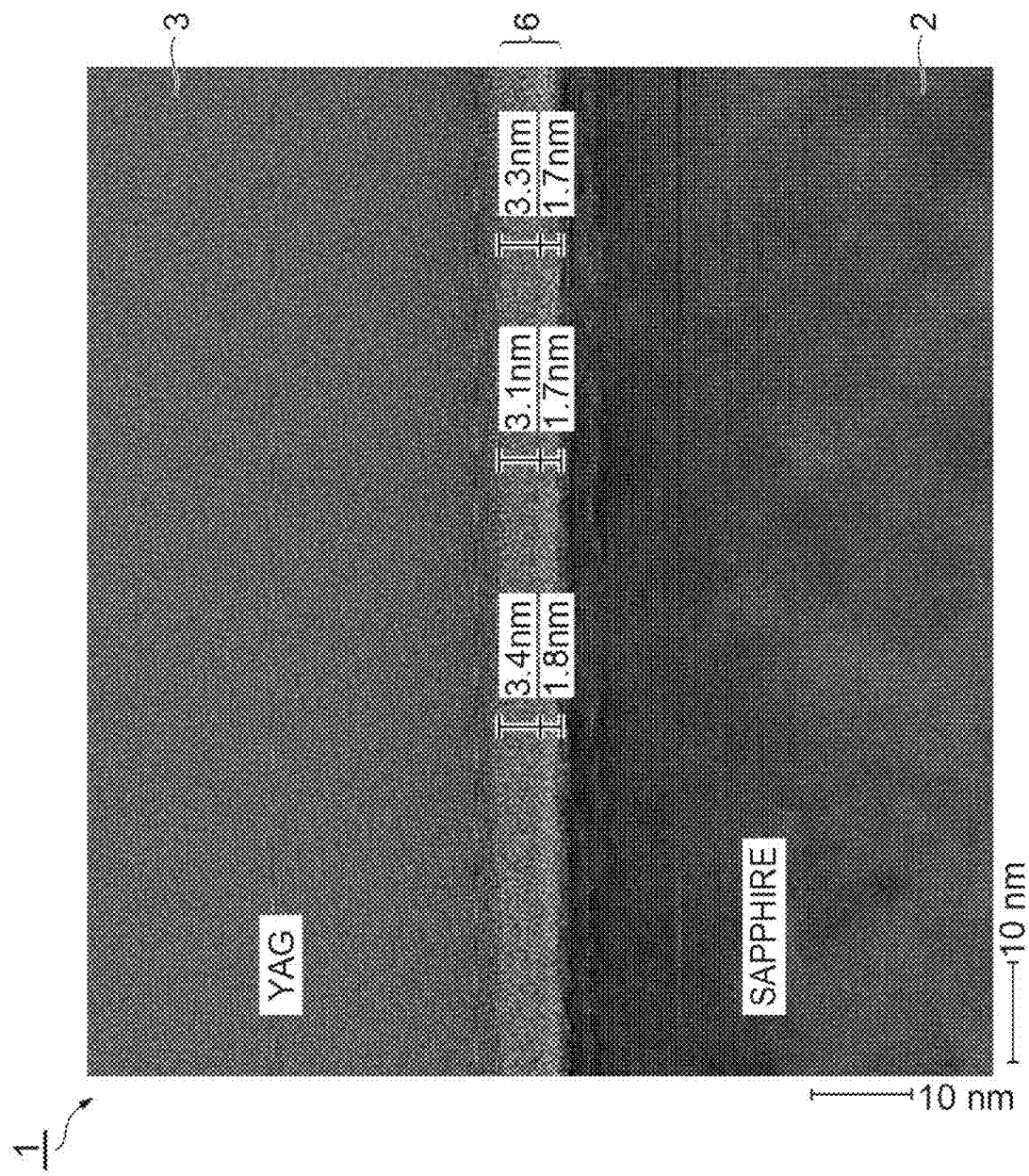
FIG. 14 is a diagram showing the periphery of the bonding portion of the laser element according to the embodiments.

FIG. 14 is a diagram showing the periphery of the bonding portion of the laser element 1, which is an element after the temperature raising step. The laser element 1 of FIG. 14 is obtained by raising the temperature of the bonded element 10 at 100° C. for 24 h. In the laser element 1 of FIG. 14, crystallization of the non-crystalline layer 16 has further progressed. As shown in FIG. 14, it can be confirmed that the crystallized layer 6 is interposed between the heat sink 2 and the laser medium 3.

In this case, the crystallized layer 6 includes, at a certain site, a 1.8-nm thick layer and a 3.4-nm thick layer from the heat sink 2 side toward the laser medium 3 side. The crystallized layer 6 includes, at another site, a 3.1-nm thick layer and a 1.7-nm thick layer from the heat sink 2 side toward the laser medium 3 side. The crystallized layer 6 includes, at still another site, a 3.3-nm thick layer and a 1.7-nm thick layer from the heat sink 2 side toward the laser medium 3 side. The progression coefficient of crystallization is 0.5 nm/h.

Thus, in the method for manufacturing the laser element 1, the non-crystalline layer 16 is subjected to epitaxial growth by raising the temperature of the bonded element 10, the non-crystalline layer 16 is crystallized, and the state of matter (bonding state) of the laser element 1 can be stabilized. For example, it is possible to enhance the strength and mechanical characteristics of the laser element 1. That is, with regard to an optical element obtained by surface activated bonding, the bonding characteristics can be enhanced without deteriorating the characteristics of the bonding parts of the optical element.

With regard to the method for manufacturing the laser element 1, in the bonding step, a bonded element 10 can be obtained by irradiating at least any one of the bonded-side surface of the heat sink 2 and the bonded-side surface of the laser medium 3 with an ion beam or a fast atomic beam in an approximately vacuum environment, and then bringing the bonded-side surface of the heat sink 2 and the bonded-side surface of the laser medium 3 into contact with each other.

Here, in the temperature raising step, there is concern that stress may be generated at the bonding portion due to the difference in the coefficient of linear expansion, and damage such as detachment may occur in the laser element 1. In this regard, it is found that when impurities of a beam source element constituting an ion beam or a fast atomic beam and/or a beam housing material are included in the non-crystalline layer 16, the temperature required for epitaxial growth at the time of raising temperature can be lowered to a predetermined temperature, which is much lower than the melting points of the heat sink 2 and the laser medium 3. Thus, in the method for manufacturing the laser element 1, the non-crystalline layer 16 includes the beam source element and/or the beam housing material, and the temperature of the temperature raising is lowered to a predetermined temperature, which is lower than the melting points of the heat sink 2 and the laser medium 3. Therefore, it is possible to suppress this damage of the laser element 1. In the crystallized layer 6, since a high temperature is not required in a solid-phase reaction, ideal crystal growth with less distortion is made possible.

In the method for manufacturing the laser element 1, the heat sink 2 is diamond, silicon carbide, sapphire, garnet including YAG, a vanadate, a laser material to which a rare earth ion or a transition metal has been added, an optical switch material, a non-linear optical material, a functional optical material, or a ceramic. The laser medium 3 is diamond, silicon carbide, sapphire, garnet including YAG, a vanadate, a laser material to which a rare earth ion or a transition metal has been added, an optical switch material, a non-linear optical material, a functional optical material, or a ceramic. The predetermined temperature, which is the temperature at the time of raising temperature (epitaxial growth temperature), is 100° C. or higher and 1100° C. or lower. In such a laser element 1 including a heat sink 2 and a laser medium 3, the state of matter of the laser element 1 can be stabilized by raising temperature, and at the same time, damage of the laser element 1 at the time of raising temperature can be suppressed.

Examples of the ceramic include ceramics having a Faraday effect, such as TGG (terbium-gallium-garnet), TAG (terbium-aluminum-garnet), and TSAG (terbium-scandium-aluminum-garnet) ceramics. Ceramics are such that end faces are susceptible to damage due to the grain boundaries, and even from the viewpoint of protection, ceramics need to be bonded and then used. Since ceramics can be fabricated only to have a thickness of about 10 mm, in the case of making a thick material, bonding is indispensable. When ceramics are bonded, since the bonding boundary substances are unstable, it is desirable to achieve stabilization by a temperature raising step (annealing treatment).

In the laser element 1, not a non-crystalline layer 16 but a crystallized layer 6 is interposed between the heat sink 2 and the laser medium 3, and in the crystallized layer 6, the elements constituting the heat sink 2 are gradually reduced, and at the same time, the elements constituting the laser medium 3 are gradually increased, along the direction from the heat sink 2 side toward the laser medium 3 side. According to such a configuration, it is possible to stabilize the state of matter of the laser element 1. In the non-crystalline layer 16, those elements undergo a change relatively slowly; however, in the crystallized layer 6, those elements undergo a steep change.

Figure 15:
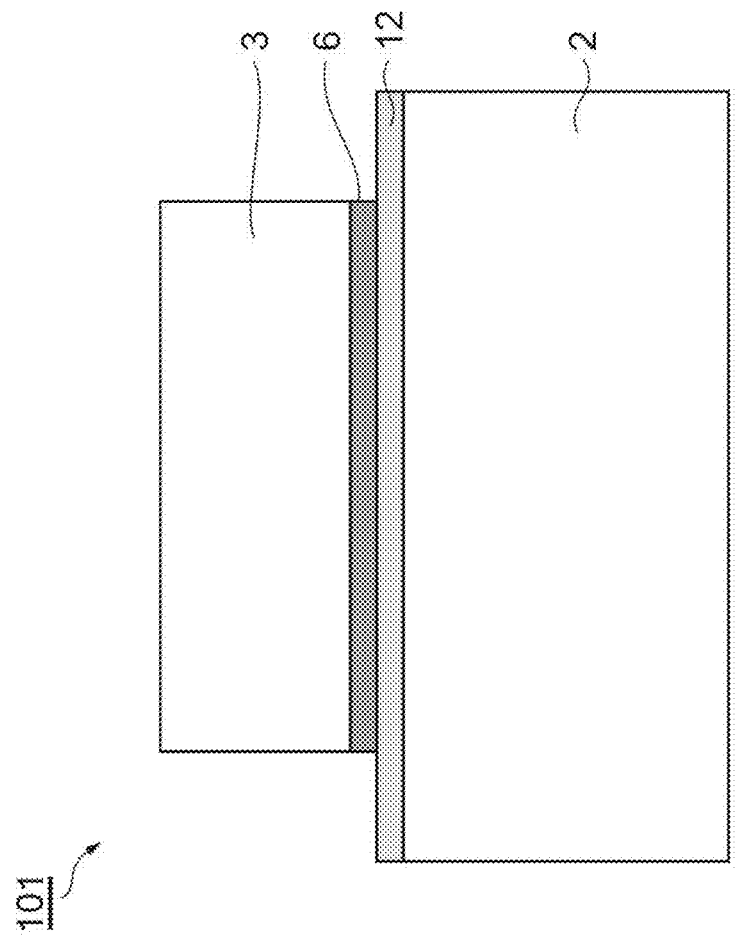
FIG. 15 is a cross-sectional view illustrating a laser element according to a modification example.

FIG. 15 is a cross-sectional view showing a laser element 101 according to a modification example. In the method for manufacturing the laser element 101, an optical coating layer 12 is formed on the surface of a heat sink 2 by providing optical coating on the surface of the heat sink 2. The optical coating is not particularly limited, and various known optical coatings can be employed. The optical coating layer 12 is a portion of the heat sink 2 and constitutes the surface side of the heat sink 2. That is, the heat sink 2 has the optical coating layer 12 at the bonded side portion thereof. Incidentally, as described above or as will be described below, the target member is not limited to the heat sink 2 and may be another laser material, and the target member may be an optical switch such as Cr:YAG, or may be a quartz crystal or a non-linear optical crystal such as LN, LBO, KTP, GaAs, GaP, ZnSe, or ZnS. In the optical coating, a layer that is made transparent by a temperature raising treatment, that is, a semiconductor material such as Si, Ga, or Zn, or Si, Al, Ti, Hf, Mg, Zr, Ta, or Nb may be deposited as a final layer of the optical coating. In other words, the final layer of the optical coating layer 12 has a layer that is made transparent by a temperature raising treatment. The layer that is made transparent by a temperature raising treatment becomes an oxide or a compound by bonding the heat sink 2 and the laser medium 3 and then heat-treating the assembly in an appropriate environment such as an oxygen atmosphere, and the layer is transparentized in the desired laser wavelength range and then sufficiently accomplishes the functions.

When the laser element 101 is manufactured, an optical coating is provided on the surface of a heat sink 2, this heat sink 2 and a laser medium 3 are bonded by surface activated bonding to form a bonded element. The bonded element is subjected to a heating treatment, and the temperature of the bonded element is raised up to a predetermined temperature. Thereby, the bonded element is annealing-treated, the non-crystalline layer of the bonded element undergoes epitaxial growth and is crystallized, and as a result, the laser element 101 shown in FIG. 15 is obtained. The predetermined temperature for temperature raising is a temperature lower than the melting points of the heat sink 2 and the laser medium 3. The predetermined temperature for temperature raising is 100° C. or higher and 600° C. or lower.

As such, in the method for manufacturing the laser element 101 according to a modification example, the heat sink 2 has an optical coating layer 12 at the bonded side portion of the heat sink 2, and the predetermined temperature for temperature raising is 100° C. or higher and 600° C. or lower. When the temperature is raised to a temperature of about 800° C. or higher, deterioration of the optical coating layer 12 is recognized. Therefore, in the method for manufacturing the laser element 101 according to the modification example, damage of the optical coating layer 12 can also be suppressed. Recrystallization by temperature raising at a sufficiently low temperature, by which the optical coating layer 12 is not damaged, that is, epitaxial growth, can be achieved.

Incidentally, the laser medium 3 may have an optical coating layer at the bonded side portion thereof, or both the heat sink 2 and the laser medium 3 may have optical coating layers at the bonded side portions thereof. The predetermined temperature for temperature raising may be 800° C. or lower, may be 200° C. to 300° C., may be 100° C., or may be higher than or equal to the bonding temperature. When the heat sink 2 is SiC or diamond, since the refractive indices are greatly different, the optical coating layer 12 is particularly effective. It is desired that the bonding temperature is the temperature at which the substance is used. Incidentally, in the optical coating, a layer that is made transparent by a temperature raising treatment, that is, a semiconductor material such as Si, Ga, or Zn, or Si, Al, Ti, Hf, Mg, Zr, Ta, or Nb may be deposited as a final layer of the optical coating. In other words, the final layer of the optical coating layer has a layer that is made transparent by a temperature raising treatment. The layer that is made transparent by a temperature raising treatment becomes an oxide or a compound by bonding the heat sink 2 and the laser medium 3 and then heat-treating the assembly in an appropriate environment such as an oxygen atmosphere, and the layer is transparentized in the desired laser wavelength range and then sufficiently accomplishes the functions.

Furthermore, in the present embodiment, the following operating effects are also provided.

With regard to the manufacture of the laser element 1, the following operating effects are also provided by adopting surface activated bonding. That is, not only bonding between materials of the same kind, but also bonding between materials of different kinds, for which bonding is generally difficult, is made possible. All materials such as metals, glass, and films can be bonded. Heat is not applied, and deformation caused by heat can be suppressed. An adhesive is not necessary. The bonding strength can be controlled. Not only strong bonding but also temporary bonding on the premise of detachment can be coped with. Since the bonding time is short, bonding can be completed in seconds in principle. There is no deviation after bonding, and high alignment accuracy can be realized.

In a Q switch type microchip laser, as the resonator is shorter, the generated pulse can be made shorter. In an end face excitation type microchip laser that uses Cr:YAG for a passive Q switch medium, usually, Nd:YAG is shortened in order to shorten the resonator. However, the absorption efficiency of the excitation light is such that $\eta = 1 - \exp(\alpha L_0)$ when the length of Nd:YAG is denoted by $L_0$, and the excitation light absorption coefficient is denoted by $\alpha$. That is, when the length $L_0$ of Nd:YAG is shortened, the absorption efficiency is decreased according to the above-described equation. Therefore, a configuration in which the surface opposite to the excitation side (boundary surface of Cr:YAG) is provided with highly reflective coating in relation to the excitation wavelength to reduce $L_0$ to a half, is adopted. However, when bonding is achieved by a sintering method, which is used for ceramic YAG, the coating layer interferes, and bonding is not achieved. For this reason, a bonded chip made of ceramic YAG is generally long, and the pulse width thus obtainable is also long. That is, only laser light sources having low performance and weak competitiveness can be produced.

By applying the present embodiment to such a bonded element, a microchip capable of generating a short pulse width is expected from ceramic YAG. Since bonding of a large area is also possible, a composite of a ceramic YAG can be produced with a mass production effect and cost reduction by forming a composite having a large area in a batch and cutting the composite into small chips. Particularly in the present embodiment, bonding of a larger area with higher bonding strength is enabled, and the mass production effect and cost reduction by large-size processing are notable. Manufacture of an optical element having high performance and high reliability is made possible.

Thus, an embodiment of the present invention has been described; however, an aspect of the present invention is not intended to be limited to the above-described embodiment.

For example, each of the numerical values described above may include errors in terms of design, measurement, manufacture, or the like. The laser element 1 according to an embodiment of the present invention can be applied to various laser components and to a laser device, and the laser device can be utilized in various devices such as a measuring device, a processing device, a diagnostic device, and a medical instrument.

According to an embodiment of the present invention, the entirety of the non-crystalline layer 16 is crystallized by raising the temperature of the bonded element 10 in the temperature raising step; however, the embodiment is not limited to crystallizing the entirety of the non-crystalline layer 16, and at least a portion of the non-crystalline layer 16 may be crystallized. The non-crystalline layer 16 may be a mixed crystal system of Si and YAG or a mixed crystal system of Si and sapphire. The melting points of these are very high such as about 2000° C.; however, the predetermined temperature as the epitaxial temperature is much lower than that.

An embodiment of the present invention may include a spatial modulation element that controls the spatial mode of laser light. For example, the spatial modulation element may be bonded to the heat sink 2 and the laser medium 3 or may not be bonded. As a result, it is possible to configure a microamplifier with high luminance and high output.

According to an embodiment of the present invention, a first element part and a second part are subjected to surface activated bonding; however, in surface activated bonding, an approximately vacuum environment may not be used at the time of bringing the heat sink 2 and the laser medium 3 into contact with each other. According to an aspect of the present invention, the second element part may be a metal including gold (Au), copper (Cu), copper-tungsten (CuW), aluminum (Al), iron (Fe), titanium (Ti), or an alloy of at least any one of these metals.

According to an embodiment of the present invention, any optical element in which laser light is transmitted, reciprocated, or reflected can all be applied to all optical elements. The optical element according to an embodiment of the present invention is not limited to an oscillator and includes an amplifier, a functional optical material (Q switch element such as Cr:YAG), a non-linear optical material, and a wavelength conversion element such as QPM-quartz crystal as well. The material to be bonded is not only a combination of a laser medium and a heat sink but may also be an optical switch such as a saturable absorber, a non-linear optical material for wavelength conversion, or the like. Regarding the optical element in which laser light is transmitted, the transmittance of transparentization does not necessarily need to be 95% or higher.

According to an embodiment of the present invention, the configuration in which bonding is achieved with an interposed crystallized layer is not particularly limited to the above-mentioned configurations and may include, for example, optical elements of the following Configuration Examples 1 to 4. Incidentally, the laser medium is, for example, RE:single crystal ceramic (YAG, YSGG, YLF, YVO$_4$, SFAP, or the like) or RE:glass. A Q switch element is, for example, Cr:YAG. A transparent heat sink is, for example, YAG, sapphire, SiC, or diamond.

Configuration Example 1

An optical element including a laser medium; a Q switch element laminated over this laser medium; and a crystallized layer between these.

Configuration Example 2

An optical element including a transparent heat sink; a laser medium laminated over this heat sink; and a crystallized layer between these.

Configuration Example 3

An optical element including a transparent heat sink; a laser medium laminated over this transparent heat sink; a Q switch element laminated over this laser medium; a crystallized layer between the transparent heat sink and the laser medium; and a crystallized layer between the laser medium and the Q switch.

Configuration Example 4

An optical element including a transparent heat sink; a laser medium laminated over this transparent heat sink; a Q switch element laminated over this laser medium; a transparent heat sink laminated over this Q switch; a crystallized layer between the transparent heat sink and the laser medium adjacent thereto; a crystallized layer between the laser medium and the Q switch; and a crystallized layer between the Q switch element and the transparent heat sink adjacent thereto.

According to an embodiment of the present invention, each of the members constituting an optical element (first element part and second element part) may be appropriately provided with a known coating layer (optical coating layer). For Nd:YAG and Cr:YAG, since the refractive indices are approximately the same, direct bonding with an interposed crystallized layer can be achieved without requiring AR (Anti Reflection) coating as a coating layer. However, in order to improve the excitation efficiency, an HR (High Reflection) coating for a target wavelength of 808 nm or 885 nm and an AR coating for a target wavelength of 1064 nm may be provided as coating layers. That is, an embodiment of the present invention includes variations such as a configuration in which coatings (optical coatings) are provided and bonding is achieved with interposing a crystallized layer therebetween. According to an embodiment of the present invention, a transparent first element part and a second element part include an optical switch element such as a Q switch element that is transparent when the switch is turned ON.

The combination of element parts to be bonded may be an appropriate combination of an optical gain medium, a Q switch element, a heat sink (YAG, sapphire, SiC, diamond, or an opaque material such as Al, Cu, or CuW), a non-linear optical element (non-linear wavelength conversion (SHG, a Raman element, or the like), a non-linear optical switch, or the like), a wave plate, a polarizer, a beam splitter, a beam coupling element, and the like. The Q switch element also includes not only conventional AO (Acousto Optic) and EO (Electro Optic) but also MO (Magneto Optic). According to an embodiment of the present invention, a wave plate or a polarizer may be disposed inside a resonator and bonded. According to an embodiment of the present invention, a non-linear optical wavelength conversion element may be included, or a beam splitter or a beam coupling element may be included. According to an embodiment of the present invention, excitation light may be introduced through the heat sink. Bonding of a transparent heat sink is also effective for preventing parasitic oscillation.

In a configuration such as a disk laser, a metal is used as the heat sink. When the metal is Al or an alloy thereof, and when only the outermost surface part of the heat sink is Al or the like, the laser medium is provided with an HR coating related to emitted laser light, and then the heat sink is bonded by some kind of method. As this some kind of method, a method of sputtering or vapor depositing an alumina layer on the outer side of the HR coating, subsequently interposing the two between anvils or the like, irradiating the two with a giant pulse laser light at a different wavelength, which is transmitted through the HR coating, and non-thermally intermingling the elements constituting the heat sink and the elements constituting the laser medium at a crystal level to achieve bonding, is also effective.

Figure 16:
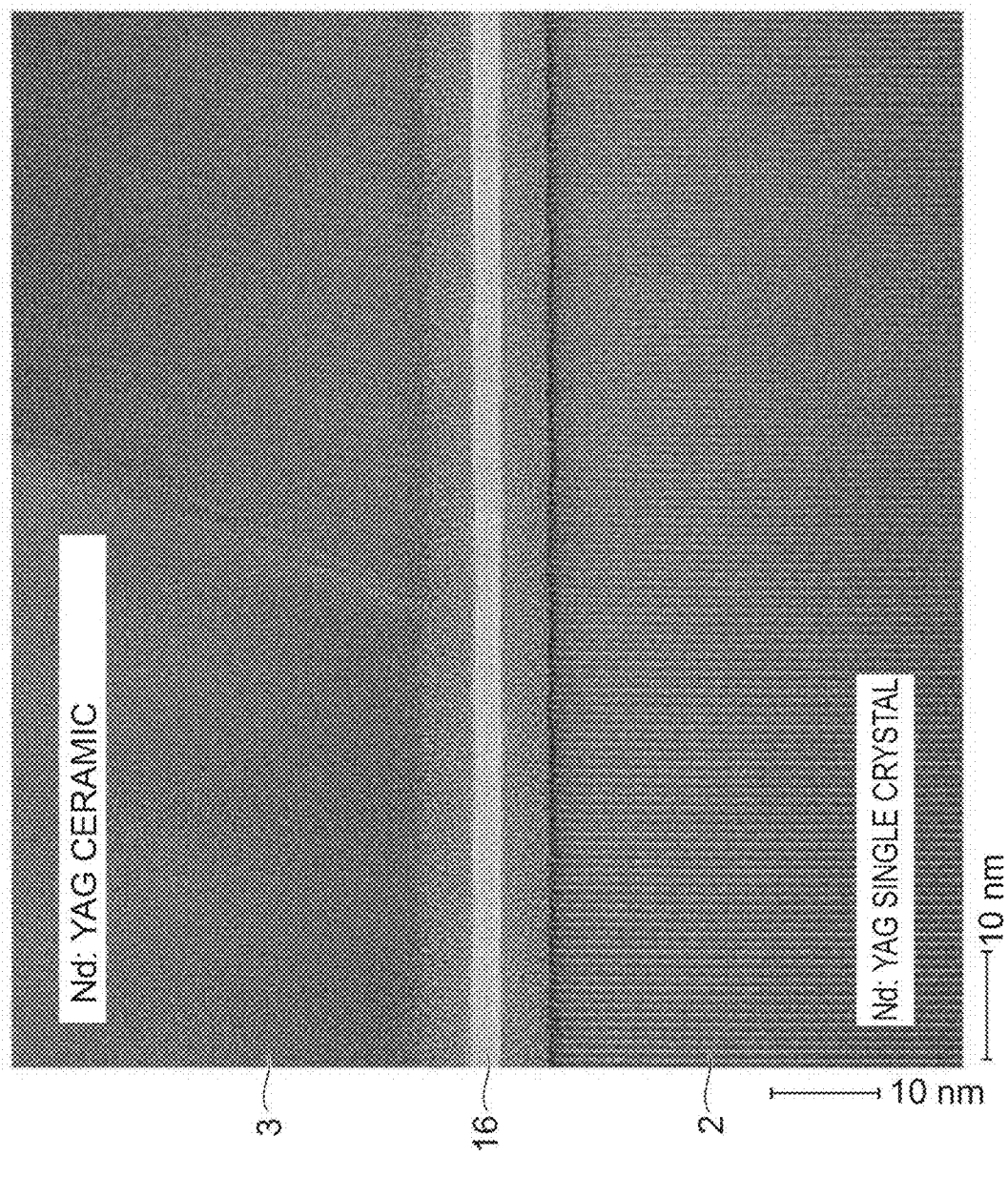
FIG. 16 is a diagram showing the periphery of a bonding portion of a bonded element, which is an element before a temperature raising step.

FIG. 16 is a diagram showing the periphery of the bonding portion of the bonded element 10, which is an element before the temperature raising step. In the sample shown in FIG. 16, Nd:YAG ceramic was used for the heat sink 2, and Nd:YAG single crystal was used for the laser medium 3 (the same applies to the following FIG. 17 to FIG. 22). The diagram of FIG. 16 show EDX data (the same applies to the following FIG. 17 and FIG. 22). As shown in FIG. 16, it can be confirmed that a non-crystalline layer 16 is interposed in the bonded element 10 before the temperature raising step (before annealing treatment). In the example shown in the diagram, the non-crystalline layer 16 has a thickness of 10 to 15 nm.

Figure 17:
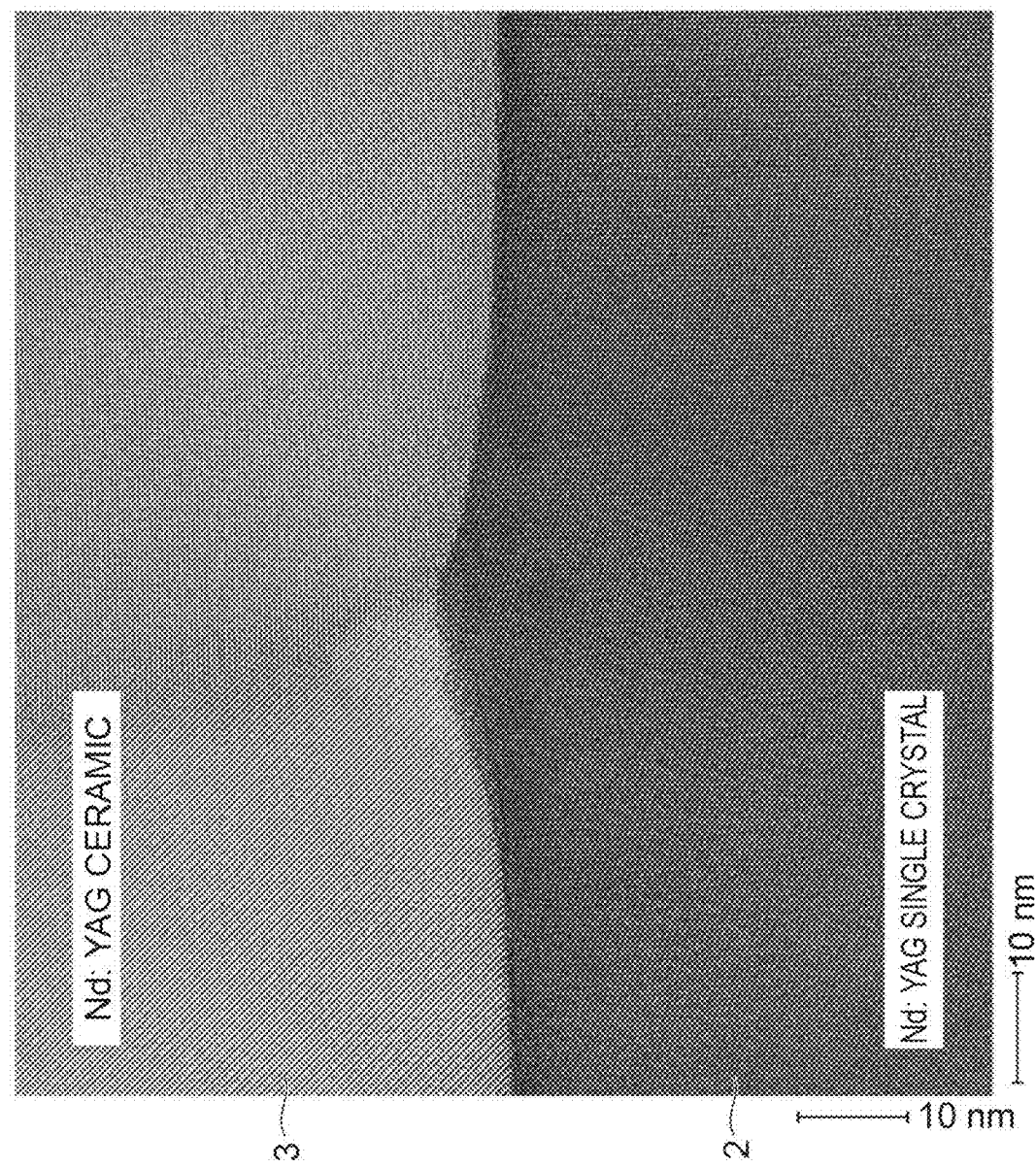
FIG. 17 is a diagram showing the periphery of a bonding portion of a laser element, which is an element after a temperature raising step.

FIG. 17 is a diagram showing the periphery of the bonding portion of the laser element 1, which is an element after the temperature raising step. As shown in FIG. 17, it can be confirmed that the non-crystalline layer 16 (see FIG. 16) is lost in the laser element 1 after the temperature raising step (after annealing treatment). Expansion of a region of Nd:YAG single crystal (epitaxial growth) can be verified.

Figure 18:
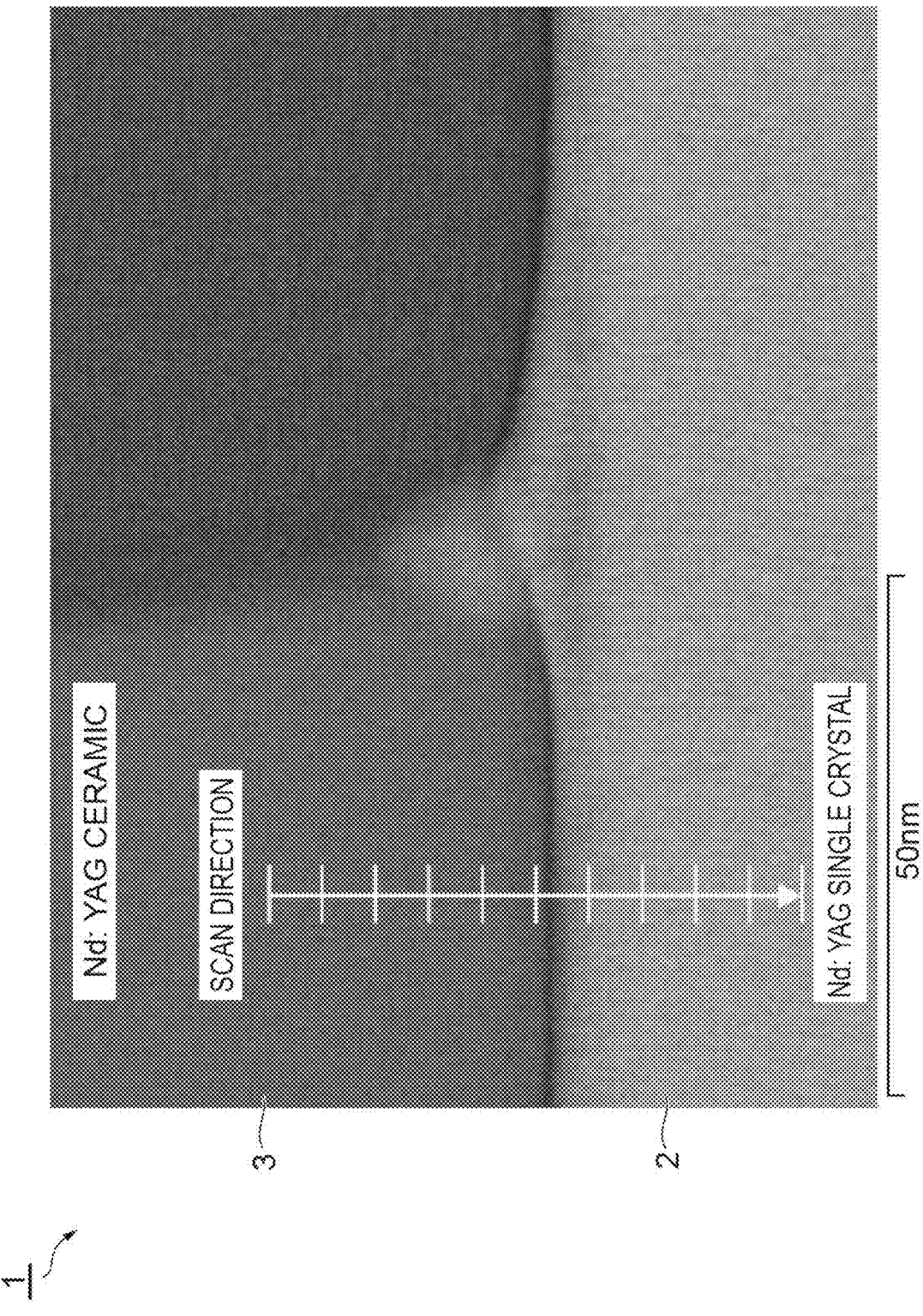
FIG. 18 is a diagram showing the periphery of the bonding portion of the laser element, which is an element after the temperature raising step.
Figure 19:
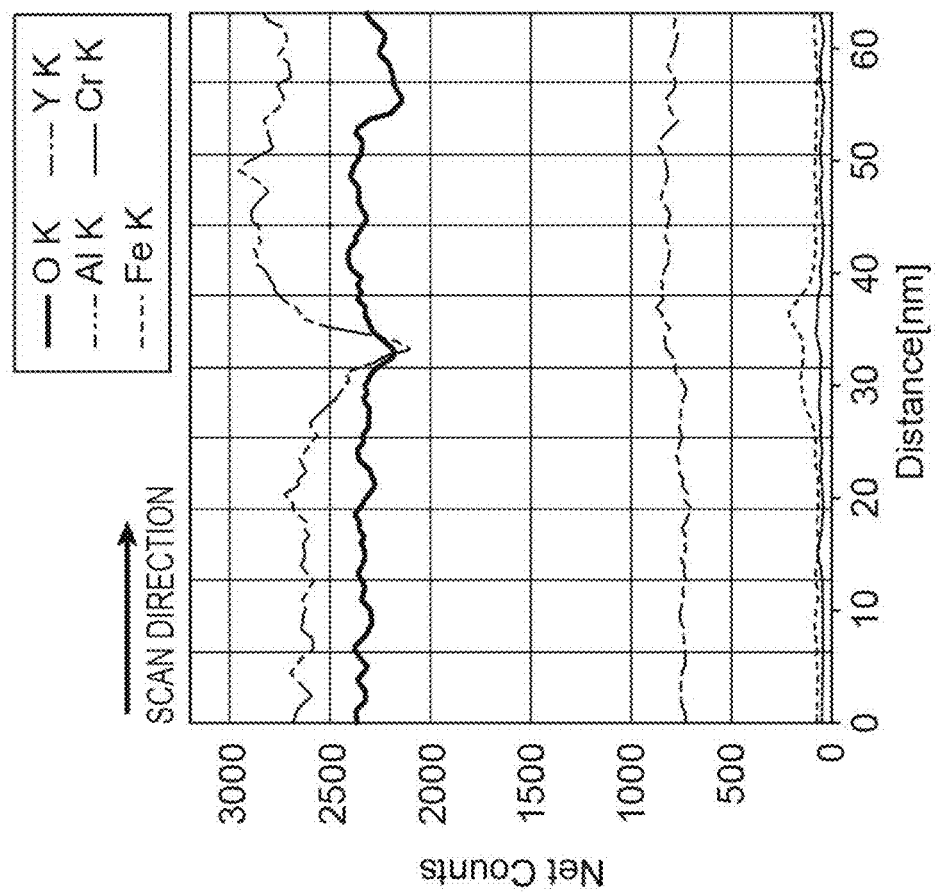
FIG. 19 is a graph showing the elements detected at a position in the scan direction shown in FIG. 18.
Figure 20:
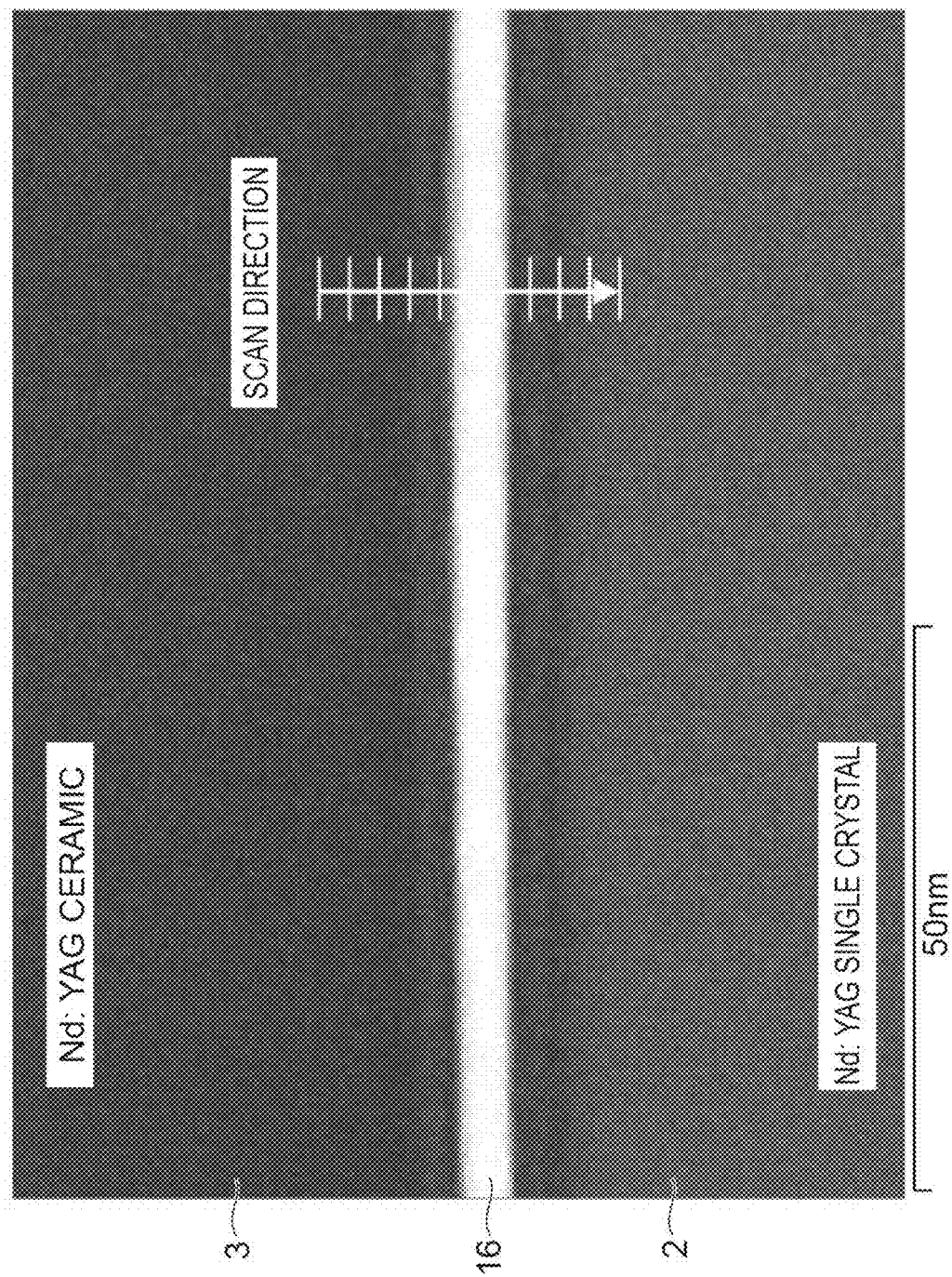
FIG. 20 is a diagram showing the periphery of the bonding portion of the bonded element, which is an element before the temperature raising step.
Figure 21:
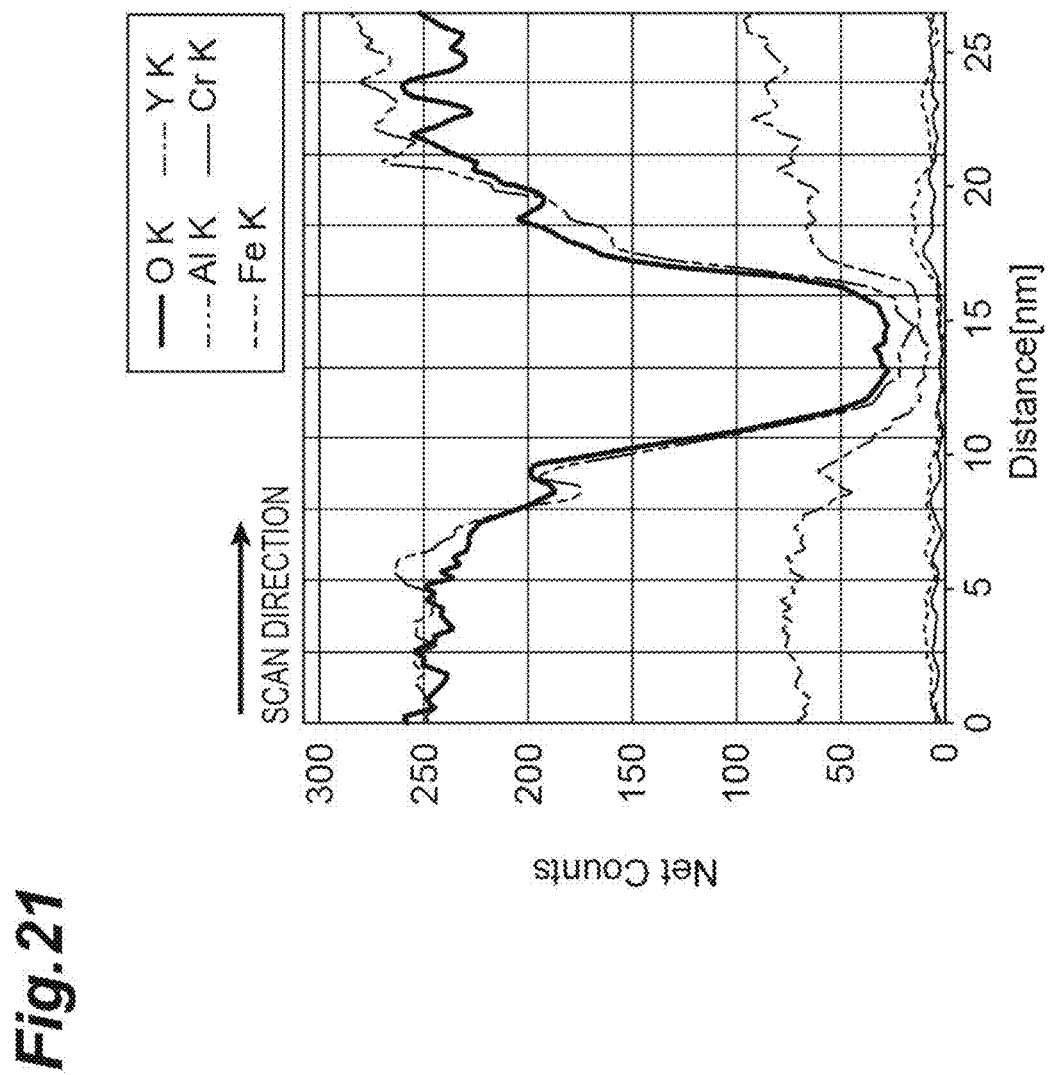
FIG. 21 is a graph showing the elements detected at a position in the scan direction shown in FIG. 20.

FIG. 18 is a diagram showing the periphery of the bonding portion of the laser element 1, which is an element after the temperature raising step. FIG. 19 is a graph showing the elements detected at a position in the scan direction shown in FIG. 18. FIG. 20 is a diagram showing the periphery of the bonding portion of the bonded element 10, which is an element before the temperature raising step. FIG. 21 is a graph showing the elements detected at a position in the scan direction shown in FIG. 20.

The diagrams of FIG. 18 and FIG. 20 are bright-field images, which are STEM images produced by detecting, among transmitted electrons, electrons that have been transmitted without being scattered and electrons that have been scattered at small angles. In the graphs of FIG. 19 and FIG. 21, the axis of ordinate represents the amount of measurement signal corresponding to the quantity of elements, and the axis of abscissa represents the scan distance. The scan direction in the graph of FIG. 19 corresponds to the direction from the top toward the bottom in FIG. 18. The scan direction in the graph of FIG. 21 corresponds to the direction from the top toward the bottom in FIG. 20. As shown in FIG. 18 to FIG. 21, it can be confirmed that for example, along the direction from the heat sink 2 side toward the laser medium 3 side, the elements constituting the heat sink 2 are gradually reduced, and at the same time, the elements constituting the laser medium 3 are gradually increased.

Figure 22:
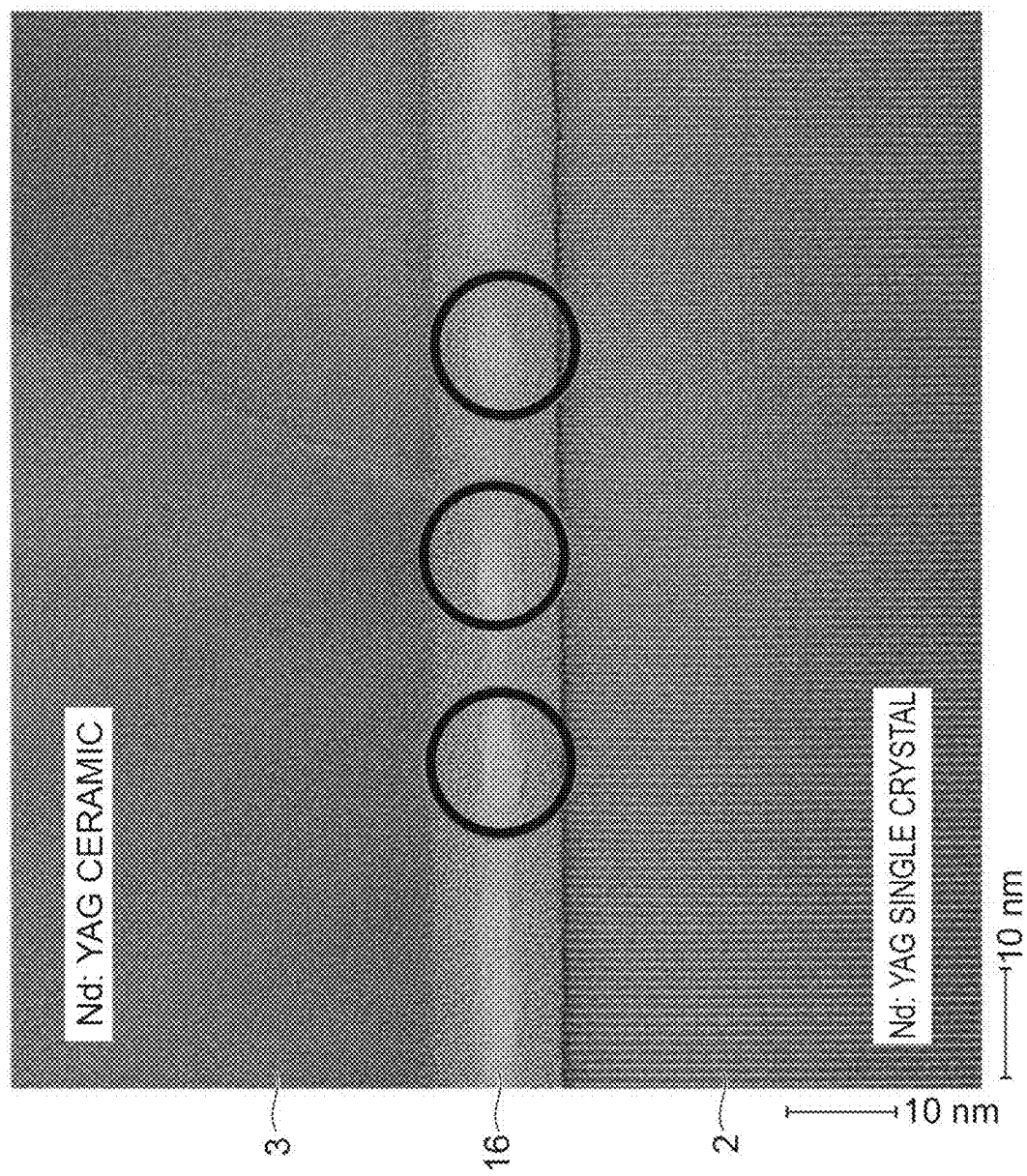
FIG. 22 is a diagram showing the periphery of a bonding portion of a bonded element after EB irradiation, the bonded element being an element before a temperature raising step.

FIG. 22 is a diagram showing the periphery of the bonding portion of the bonded element 10 after EB irradiation, the bonded element 10 being an element before the temperature raising step. The instability of the non-crystalline layer 16 at the bonding interface between Nd:YAG ceramic and Nd:YAG single crystal is notable, and as shown inside the circular frame of FIG. 22, it can be confirmed that after EB (Electron Beam) irradiation in the middle of analysis, voids have been generated in the non-crystalline layer 16. Incidentally, before EB irradiation, there is no damage to the non-crystalline layer 16 (see FIG. 16). When the non-crystalline layer has been crystallized by the temperature raising step (annealing treatment), such damage is not observed. By raising temperature after bonding between a YAG single crystal and a YAG ceramic, a ceramic region, which is a polycrystalline substance, including the bonding interface is converted into a single crystal, and deterioration of ceramic-derived characteristics, for example, orientation and scattering of electrons and phonons at the grain interfaces, is suppressed. A technique of subjecting any ceramic material and a single crystal to surface activated bonding and then converting the materials into a single crystal by temperature raising, is effective for improving the characteristics of the material.

For example, as shown in at least any one of FIG. 16 to FIG. 22, according to an aspect of the present invention, a ceramic and a single crystal are subjected to surface activated bonding and then temperature raising, and thereby a ceramic region, which is a polycrystalline substance, including the bonding interface of the ceramic and the single crystal is converted into a single crystal by a solid-phase method at or below the melting point.

For example, as shown in at least any one of FIG. 16 to FIG. 22, an aspect of the present invention is an optical element in which laser light is transmitted, reciprocated, or reflected, and the optical element includes a first element part and a second element part, both being transparent to laser light; and a crystallized layer interposed between the first element part and the second element part and formed by crystallization, wherein in the crystallized layer, the elements constituting the first element part are continuously exchanged with the elements constituting the second element part in a 10-nm region along the direction from the first element part side toward the second element part side.

For example, as shown in at least any one of FIG. 16 to FIG. 22, an aspect of the present invention is an optical element in which laser light is transmitted, reciprocated, or reflected, and the optical element includes a first element part and a second element part, both being transparent to laser light; and a crystallized layer interposed between the first element part and the second element part and formed by crystallization, wherein at least one of the first element part and the second element part has an optical coating layer at the bonded side portion thereof, and the elements constituting the first element part or the second element part are continuously exchanged with the elements constituting the optical coating layer in a 10-nm region in the crystallized layer of the first element part or the second element part adjoining the optical coating layer.

For example, as shown in at least any one of FIG. 16 to FIG. 22, according to an aspect of the present invention, at least one of the first element part and the second element part has an optical coating layer at the bonded side part thereof, and the crystallized layer includes at least any one of Ar, Ne, Xe, He, Fe, Ni, and Cr. Incidentally, it has been found that when the above-described ceramic YAG is subjected to an annealing treatment at 500° C., LIDT (laser-induced damage threshold) can be increased, and when the above-described ceramic YAG is subjected to an annealing treatment at 100° C., the ceramic YAG is likely to deteriorate.

REFERENCE SIGNS LIST

1, 101: laser element (optical element), 2: heat sink (first element part), 3: laser medium (second element part), 6: crystallized layer, 10: bonded element, 12: optical coating layer, 16: non-crystalline layer, E1: interface, E2: interface, L: laser light.

The invention claimed is:

1. A method for manufacturing an optical element in which laser light is transmitted, reciprocated, or reflected, the method comprising:
    a first step of obtaining a bonded element formed by subjecting a first element part and a second element part, both element parts being transparent to laser light, to surface activated bonding with a non-crystalline layer interposed therebetween; and
    after the first step, a second step of raising the temperature of the bonded element so as to crystallize at least a portion of the non-crystalline layer,
    wherein in the second step, the temperature of the bonded element is raised to a predetermined temperature, the predetermined temperature being lower than the melting points of the first element part and the second element part.

2. The method for manufacturing an optical element according to claim 1, wherein in the first step, the bonded element is obtained by irradiating at least any one of the bonded-side surface of the first element part and the bonded-side surface of the second element part with an ion beam or a fast atomic beam in an approximately vacuum environment, and then bringing the surface of the first element part and the surface of the second element part into contact with each other.

3. The method for manufacturing an optical element according to claim 2, wherein in the first step, the non-crystalline layer includes, as impurities other than the substances constituting the first element part and the second element part, at least any one of a beam source element constituting the ion beam or the fast atomic beam, and a beam housing material constituting the beam housing of the ion beam or the fast atomic beam.

4. The method for manufacturing an optical element according to claim 1,
    wherein the first element part is diamond, silicon carbide, sapphire, garnet including YAG, a vanadate, a sesquioxide, a fluoride, apatite, a tungstate, a silicate, a phosphoric acid-based material, a laser material to which a rare earth ion or a transition metal has been added, an optical switch material, a non-linear optical material, or a functional optical material, the second element part is a metal including gold, copper, copper-tungsten, aluminum, iron, titanium, or an alloy of at least any one of these metals, diamond, silicon carbide, sapphire, garnet including YAG, a vanadate, a sesquioxide, a fluoride, apatite, a tungstate, a silicate, a phosphoric acid-based material, a laser material to which a rare earth ion or a transition metal has been added, an optical switch material, a non-linear optical material, or a functional optical material, and the predetermined temperature of the second step is a temperature higher than or equal to 100° C. and lower than the melting point of the substance constituting the non-crystalline layer.

5. The method for manufacturing an optical element according to claim 1, wherein the state of the first element part and the second element part is a single crystal state, an amorphous state (including glass), or a ceramic state.

6. The method for manufacturing an optical element according to claim 4, wherein at least one of the first element part and the second element part has an optical coating layer at the bonded-side portion thereof, and the predetermined temperature is 100° C. or higher and 600° C. or lower.

7. The method for manufacturing an optical element according to claim 6, wherein a final layer of the optical coating has a layer that is made transparent by a temperature raising treatment.

8. The method for manufacturing an optical element according to claim 1, wherein in the second step, the degree of planarity of the interface of the crystallized layer formed by crystallizing the non-crystalline layer, is higher than the degree of planarity of the interface of the non-crystalline layer.

9. An optical element in which laser light is transmitted, reciprocated, or reflected, the optical element comprising:

a first element part and a second element part, both being transparent to the laser light; and a crystallized layer interposed between the first element part and the second element part and formed by crystallization, wherein in the crystallized layer, the elements constituting the first element part are continuously exchanged with the elements constituting the second element part in a 10-nm region along the direction from the first element part side toward the second element part side.

10. The optical element according to claim 9, wherein the crystallized layer includes at least any one of Ar, Ne, Xe, He, Fe, Ni, and Cr.

11. An optical element in which laser light is transmitted, reciprocated, or reflected, the optical element comprising:

a first element part and a second element part, both being transparent to the laser light; and a crystallized layer interposed between the first element part and the second element part and formed by crystallization, wherein at least one of the first element part and the second element part has an optical coating layer at the bonded-side portion thereof, and the elements constituting the first element part or the second element part are continuously exchanged with the elements constituting the optical coating layer in a 10-nm region in the crystallized layer of the first element part or the second element part adjoining the optical coating layer.

12. The optical element according to claim 9, wherein at least one of the first element part and the second element part has an optical coating layer at the bonded-side portion thereof, and the crystallized layer includes at least any one of Ar, Ne, Xe, He, Fe, Ni, and Cr.

* * * * *